United States Patent
Zhang et al.

(10) Patent No.: US 8,913,627 B2
(45) Date of Patent: Dec. 16, 2014

(54) METHOD TO IMPROVE CHANNEL UTILIZATION IN A TIME DIVISION MULTIPLE ACCESS BASED PROTOCOL

(75) Inventors: Zhigang Zhang, Beijing (CN); Xiao Jun Ma, Beijing (CN); Linxiang Cheng, Beijing (CN); Xian Lei Wang, Beijing (CN); Yanfeng Zhang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 707 days.

(21) Appl. No.: 13/120,187

(22) PCT Filed: Oct. 13, 2009

(86) PCT No.: PCT/IB2009/007121
§ 371 (c)(1),
(2), (4) Date: Mar. 22, 2011

(87) PCT Pub. No.: WO2010/043947
PCT Pub. Date: Apr. 22, 2010

(65) Prior Publication Data
US 2011/0170559 A1     Jul. 14, 2011

(30) Foreign Application Priority Data

Oct. 14, 2008 (EP) .................................... 08305679

(51) Int. Cl.
| | |
|---|---|
| *H04L 12/413* | (2006.01) |
| *H04J 3/16* | (2006.01) |
| *H04N 21/61* | (2011.01) |
| *H04L 12/28* | (2006.01) |
| *H04N 7/173* | (2011.01) |

(52) U.S. Cl.
CPC .......... *H04N 7/17309* (2013.01); *H04J 3/1694* (2013.01); *H04N 21/6168* (2013.01); *H04L 12/2861* (2013.01)
USPC .......................................... 370/445; 370/458

(58) Field of Classification Search
None
See application file for complete search history.

(56) References Cited

U.S. PATENT DOCUMENTS

| | | | | |
|---|---|---|---|---|
| 5,852,723 | A * | 12/1998 | Kalkunte et al. | 709/235 |
| 6,331,973 | B1 * | 12/2001 | Young et al. | 370/337 |

(Continued)

FOREIGN PATENT DOCUMENTS

| | | |
|---|---|---|
| TW | 200838238 A | 9/2008 |
| WO | WO9900933 | 1/1999 |
| WO | WO2007116064 | 10/2007 |

*Primary Examiner* — Hassan Kizou
*Assistant Examiner* — Roberta A Shand
(74) *Attorney, Agent, or Firm* — Robert D. Shedd; Jerome G. Schaefer

(57) ABSTRACT

A method and apparatus are described including receiving a report from an associated station, updating a list responsive to the report, adjusting a timeslot allocation map responsive to the updated list, encapsulating the adjusted map, transmitting the encapsulated adjusted map and assigning a timeslot specified in the timeslot allocation map to the associated station. Also described are a method and apparatus including receiving a synchronization frame over a communications channel, decapsulating a map located in the synchronization frame, determining if there is a timeslot specified in the map for which this associated station is one of an assigned main owner and an assigned backup owner, transmitting data over the communications channel during the timeslot for which this associated station is the assigned main owner, sensing the communications channel for a time interval and transmitting data over the communications channel that is idle for the time interval during the timeslot for which this associated station is the assigned backup owner.

6 Claims, 22 Drawing Sheets

(56) References Cited

U.S. PATENT DOCUMENTS

| | | |
|---|---|---|
| 6,600,754 B1 | 7/2003 | Young et al. |
| 6,795,449 B1 | 9/2004 | Kim |
| 6,954,428 B2 * | 10/2005 | Gotoh et al. ............... 370/230.1 |
| 7,154,877 B2 * | 12/2006 | Le et al. .................... 370/346 |
| 7,177,298 B2 * | 2/2007 | Chillariga et al. ......... 370/348 |
| 7,277,412 B2 * | 10/2007 | Sugaya et al. ............. 370/337 |
| 7,760,625 B2 * | 7/2010 | Miyaho et al. ............. 370/229 |
| 7,808,960 B1 * | 10/2010 | Chan et al. ................ 370/338 |
| 7,907,628 B2 * | 3/2011 | Hall et al. .................. 370/461 |
| 8,072,928 B2 * | 12/2011 | Sinha ......................... 370/329 |
| 8,184,577 B2 | 5/2012 | Tseng |
| 2002/0071413 A1 * | 6/2002 | Choi .......................... 370/337 |
| 2004/0114626 A1 * | 6/2004 | Cline et al. ................ 370/468 |
| 2008/0095100 A1 * | 4/2008 | Cleveland et al. ......... 370/328 |
| 2010/0021173 A1 * | 1/2010 | Zhang et al. .............. 398/98 |

\* cited by examiner

METHOD TO IMPROVE CHANNEL UTILIZATION IN A TIME DIVISION MULTIPLE ACCESS BASED PROTOCOL

CROSS-REFERENCE TO RELATED APPLICATIONS

This application claims the benefit, under 35 U.S.C. §365 of International Application PCT/IB2009/007121, filed 13 Oct. 2009, which was published in accordance with PCT Article 21(2) on 22 Apr. 2010 in English and which claims the benefit of European Patent Application No. EP08305679.6, filed 14 Oct. 2008.

FIELD OF THE INVENTION

The present invention relates to data transmission technology, and particularly to a method and apparatus to improve channel utilization in a time division multiple access (TDMA) protocol.

BACKGROUND OF THE INVENTION

There are some existing specifications which define the communications and operational support interface requirements for a data-over-cable system. One of these specifications is data over cable service interface specification (DOCSIS), an international standard which permits the addition of high-speed data transfer to an existing cable television (CATV) system and is employed by many cable television operators to provide Internet access over their existing hybrid fiber coaxial (HFC) infrastructure.

Cable modems based on solutions such as DOCSIS are expensive and are not suitable to provide a quality of service (QoS) that is sensitive to real time audio communication and video streaming services in cable networks. It is desirable to develop a new system to transmit data through a CATV cable access network which can guarantee good quality of service (QoS) and leverage off of existing standard protocols at a reasonable cost. A user-terminal device or modem which operates on an existing CATV system and provides data services, such as wireless connectivity to an internet protocol network, is also desirable in a cable data system. In such a modem, reasonable opportunity to support both a cable interface and a wireless interface is sought to ensure sufficient bandwidth availability for a good quality user experience.

SUMMARY OF THE INVENTION

In the TDMA based mechanism, resources are wasted when a STA does not have traffic to transmit and its unused timeslot cannot be used by another STA. The present invention provides a method to reuse the free timeslots when the STA, which has been authorized to use the timeslot, does not have traffic to transmit during the specific period, thus increasing the channel's utilization rate.

In some networks, for example, LANs, physical layer carrier sensing is used to determine the current state of use of the underlying medium (wired or wireless). Only if the carrier sensing function indicates the medium is idle, the station can initiate the data transmission over the shared wireless or wired medium. The MAC (Medium Access Control) layer can access the result of physical layer carrier sensing and then report it to higher layer.

The access point (AP) of the present invention is responsible for allocating and adjusting timeslots to itself or stations to ensure that they gain access to the medium in non-overlapping timeslots. The access point assigns a unique Association ID (AID) to every associated station in ascending order starting at 0 and delivers the assigned AID to the station in an association response management frame. When a station disassociates from AP, AP reuses the AID for the next station which requests association with the AP.

In the present invention, every allocated timeslot is authorized to be accessed by two owners: one main owner and one backup owner. Thus, the present invention improves channel utilization. Thus, a method and apparatus are described including receiving a report from an associated station, updating a list responsive to the report, adjusting a timeslot allocation map responsive to the updated list, encapsulating the adjusted map, transmitting the encapsulated adjusted map and assigning a timeslot specified in the timeslot allocation map to the associated station, wherein the associated station is one of a main owner and a backup owner of the assigned timeslot. Also described are a method and apparatus including receiving a synchronization frame over a communications channel, decapsulating a map located in the synchronization frame, determining if there is a timeslot specified in the map for which this associated station is one of an assigned main owner and an assigned backup owner, transmitting data over the communications channel during the timeslot for which this associated station is the assigned main owner, sensing the communications channel for a time interval and transmitting data over the communications channel that is idle for the time interval during the timeslot for which this associated station is the assigned backup owner.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DISCUSSION OF THE EMBODIMENTS

General Description

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire set. That is, multicast may include broadcast and is therefore a broader term than broadcast as used herein. Data/content is transmitted in packets or frames. As used herein a station can be a node or a client device, which can be a mobile terminal or mobile device such as, but not limited to, a computer, laptop, personal digital assistant (PDA) or dual mode smart phone.

In order to provide data service over existing coaxial cable TV system (CATV), at least one implementation deploys a time division function (TDF) protocol compliant access point (AP) and stations (STAs) in the cable access network. The AP and STAs are connected via couplers in the hierarchical tree structure. In this way, a user at home can access the remote internet protocol (IP) core network via the cable access network. Access to the IP core by the user opens up services such as, but not limited to, Internet access, digital telephone access (e.g. voice over internet protocol), and cable television programming. An example network architecture 100 is illustrated in FIG. 1.

Figure 1:
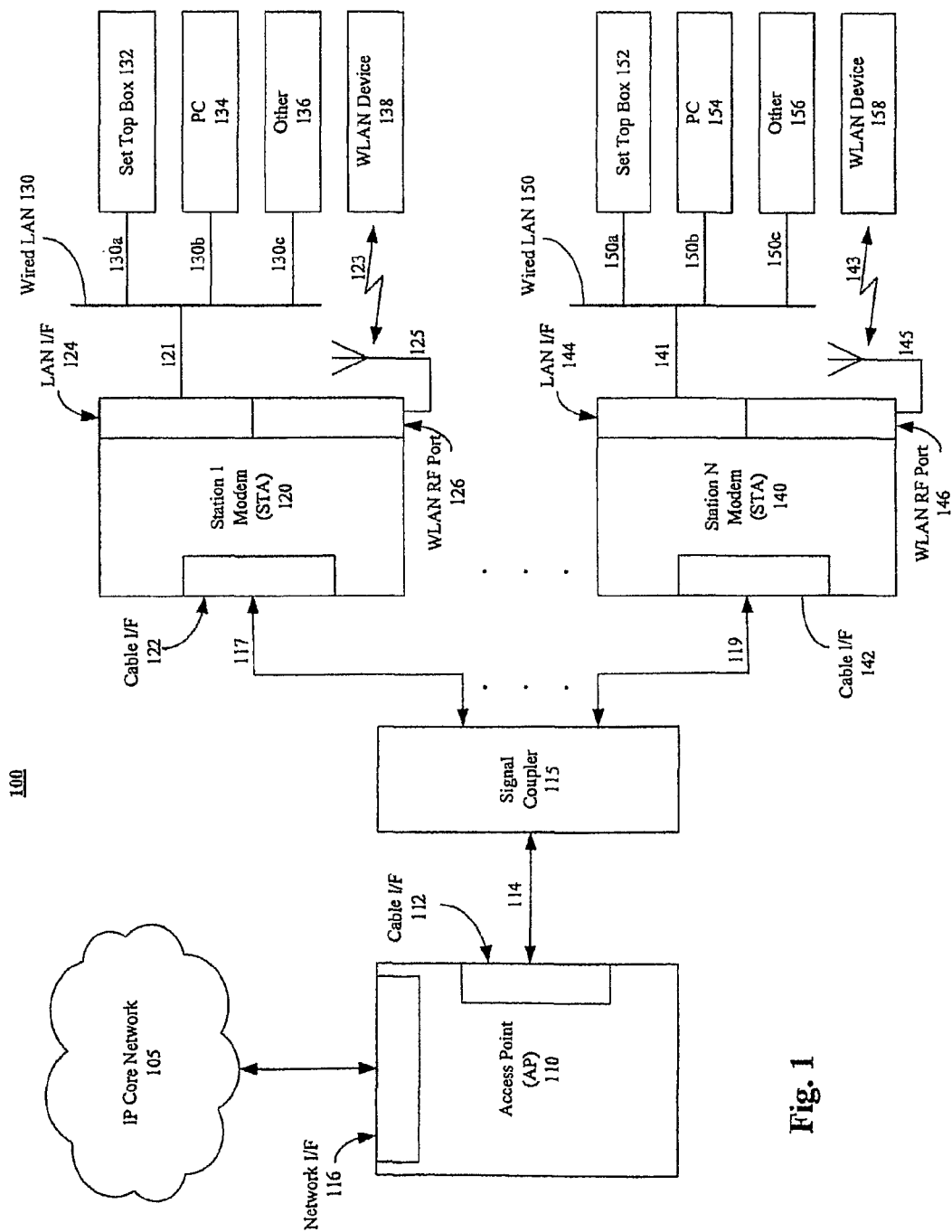
FIG. 1 illustrates a simplified exemplary TDF access network architecture.

FIG. 1 depicts one embodiment of a network that accesses an IP core 105. The IP core may be any digital network that uses an Internet Protocol or equivalent digital data transfer protocol. In the example embodiment of FIG. 1, a time division function (TDF) protocol compliant access point (AP) 110 has a network interface 116, such as wired LAN or optical interface, in connection with the IP core network 105, and a cable interface 112 in connection with a cable access network. Many such access points may be connected to the IP core network. The cable access interface 112 of AP 110 may be any form of cable such as optical fiber, coaxial, or other physically connected communications medium. The cable network can include a signal coupler 115, if required, and distribution mediums such as interconnecting cables 117 and 119. Although only two such distribution cables are shown in FIG. 1, it is understood that a multiplicity of such distribution connections are possible.

In the example of FIG. 1, the distribution cables 117 and 119 connect to TDF protocol compliant stations (STAs) 120, 140 via cable interfaces 122 and 142 respectively. STAs 120 and 140 are TDF compliant and act as user-terminals which can connect with the cable access network with a multiplicity of interfaces for a user. Those interfaces include, but are not limited to both a conventional physical local area network (LAN) and a wireless local area network (WLAN). One example LAN is an Ethernet compliant network. One example wireless network is an IEEE 802.11 compatible wireless network.

FIG. 1 depicts a station 1 modem 120 and station N modem 140 as having similar interfaces. However, this representation is merely exemplary because stations of different capabilities may be attached to the cable network provided the stations are communicatively compliant with the AP 110. For example, a station modem may have all of the user interfaces shown in FIG. 1 or only a selected subset. In FIG. 1, station 1 is configured to support a LAN interface 124 driving LAN connection 121 to a physical wired LAN 130 having stubs 130a, 130b, and 130c. The stubs support LAN compliant devices such as a set top box 132 for television and other services, a personal computer (PC) for network services, such as Internet service, and other LAN compliant devices 136 which may include devices that support any type of digital service that provides multimedia services such as video, audio, telephony, and data. Such LAN compliant devices 136 include but are not limited to a fax, a printer, a digital telephone, a server, etc. FIG. 1 depicts station 120 as also providing wireless services via WLAN radio frequency (RF) port 126 to drive antenna 125. The resulting wireless transmissions 123 can be used by a WLAN compliant device 138 to provide services to a user that include any of multimedia voice, audio, telephony, and data. Although only one wireless device 138 is shown, a multiplicity of such wireless devices may be used. Likewise, Station N also includes LAN interface 144 to drive LAN connection 141 for physical LAN 150 having stubs 150a, 150b, and 150c. Such stubs support communications with such LAN compatible devices such as set top box 152, PC 154, and other devices 156. WLAN RF port 146 supports antenna 145 providing link 143 for communication with WLAN device 158. It is understood by those of skill in the art that appropriate interface drivers exist for each of the network interface 116, cable interfaces 112, 122, 142, wired LAN interfaces 124, 144, and WLAN RF interfaces 126, 146 in FIG. 1.

In one embodiment of the network 100, both TDF compliant APs and STAs implement a protocol stack separately in a logically linked control sublayer, MAC sublayer and physical layer, according to IEEE 802.11 series specifications. However, in the MAC sublayer, the TDF APs and STAs replace the IEEE 802.11 frame transmission entity with TDF frame/message/signal transmission entity. So, the MAC sublayer for TDF APs and STAs includes an IEEE 802.11 frame encapsulation/decapsulation entity and TDF frame transmission entity, while the MAC sublayer for IEEE 802.11 compliant APs and STAs includes IEEE 802.11 compliant frame encapsulation/decapsulation entity and an IEEE 802.11 frame transmission entity. For an integrated AP and STA, the TDF frame transmission entity and IEEE 802.11 frame transmission entity may co-exist at the same time, to provide both IEEE 802.11 and TDF functionality. The switch between the two modes can be realized by manual or dynamic configuration.

TDF Protocol Introduction

The AP 110 and the STAs 120 and 140 of FIG. 1 utilize a TDF protocol to communicate on the cable medium. In one embodiment of the TDF protocol, IEEE 802.11 frames are transmitted via the cable media instead of over the air. The purpose of utilizing the IEEE 802.11 mechanism is to make use of the mature hardware and software implementation of IEEE 802.11 protocol stacks. Thus, TDF, using IEEE 802.11 frames, is used in the cable network of FIG. 1 as the communication standard between an AP and its associated STAs.

One feature of TDF is its unique medium access control method for transmitting IEEE 802.11 data frames. In one embodiment, TDF does not utilize the conventional IEEE 802.11 DCF (distributed coordination function) or PCF (point coordination function) mechanism to exchange MAC frames, which include MSDU (MAC service data unit) and MMPDU (MAC management protocol data unit). Instead, TDF uses a time division access method to transmit MAC frames/messages/signals. So the TDF is an access method which defines a detailed implementation of a frame transmission entity located in MAC sublayer.

Figure 2:
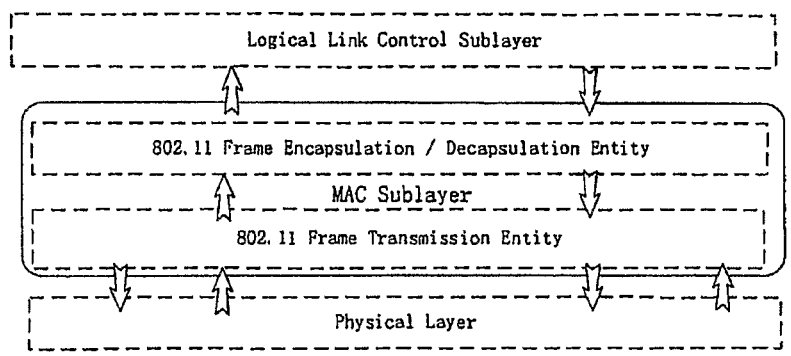
FIG. 2 illustrates the 802.11 MAC sublayer in OSI reference model.
Figure 3:
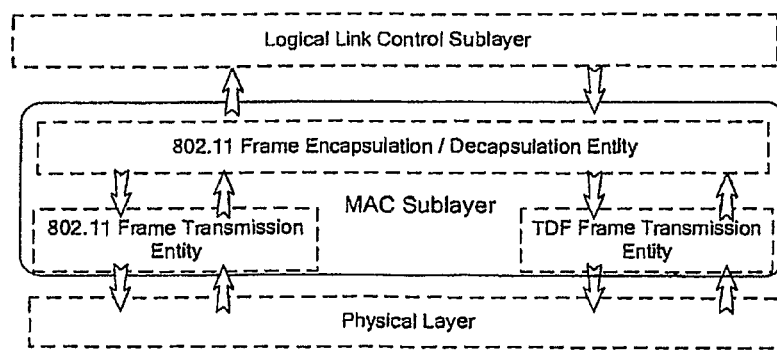
FIG. 3 illustrates an implementation of a TDF transmission entity in OSI reference model.

FIG. 2 illustrates the standard IEEE 802.11 MAC sublayer protocol in the open system interconnection (OSI) reference model. In comparison, FIG. 3 illustrates details of the frame transmission entities for the TDF protocol in the OSI reference model.

Figure 4:
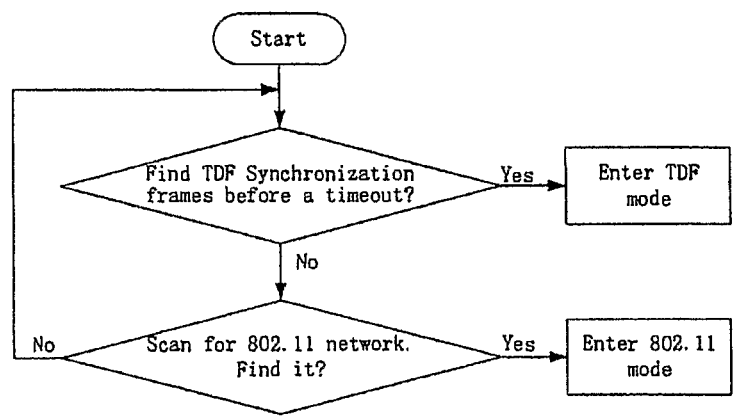
FIG. 4 illustrates an implementation of a communication mode entrance procedure.

In one embodiment, stations, such as STA 120 and STA 140, operate in two communication modes. One mode is the standard IEEE 802.11 operation mode which obeys the frame structure and transmission mechanism defined in IEEE 802.11 series standard. The other mode is the TDF operation mode. The determination of which operation mode to enter when a STA is started is indicated in FIG. 4. Once a STA receives a synchronization frame/message/signal from an AP, the STA enters into TDF mode. If there is no synchronization frame received within a preset timeout, then the STA remains or shifts into IEEE 802.11 mode.

TDF Protocol Functional Descriptions:

Access Method

The physical layer in a TDF station may have multiple data transfer rate capabilities that allow implementations to perform dynamic rate switching with the objective of improving performance and device maintenance. In one embodiment, a station may support at least three types of data rates: 54 Mbps, 18 Mbps and 6 Mbps. Data service may be provided mainly at a 54 Mbps data rate. If there are problems for a STA to support 54 Mbps data transmission, the STA may temporarily switch to 18 Mbps data rate. The 6 Mbps data rate operation mode is designed for the purpose of network maintenance and station debugging.

The data rate may be configured statically before a TDF station enters the TDF communication procedure, and remain the same during the whole communication process. On the other hand, the TDF station may also support dynamic data rate switching during the service. The criteria for the data rate switching may be based on the channel signal quality and other factors.

The fundamental access method of the TDF protocol is time division multiple access (TDMA), which allows multiple users to share the same channel by dividing it into multiple different timeslots. The STAs transmit in rapid succession for uplink traffic, one after the other, each using their own timeslot within a TDF superframe assigned by the AP. For downlink traffic, the STAs share the channel, and select the data frames/messages/signals or management frames/messages/signals targeted to them by comparing the destination address information in the frames with their address. Downlink traffic is defined as the transport of data from an AP to a STA. Examples of downlink traffic include requested digital data/content, such as audio or video requested by a user. Down link data can be either unicast, broadcast, or multicast. Uplink traffic is defined as the transport of data from a STA to the AP. Examples of uplink traffic include a user request for digital data/content or commands to the AP to perform some function. Uplink data is generally unicast.

Figure 5:
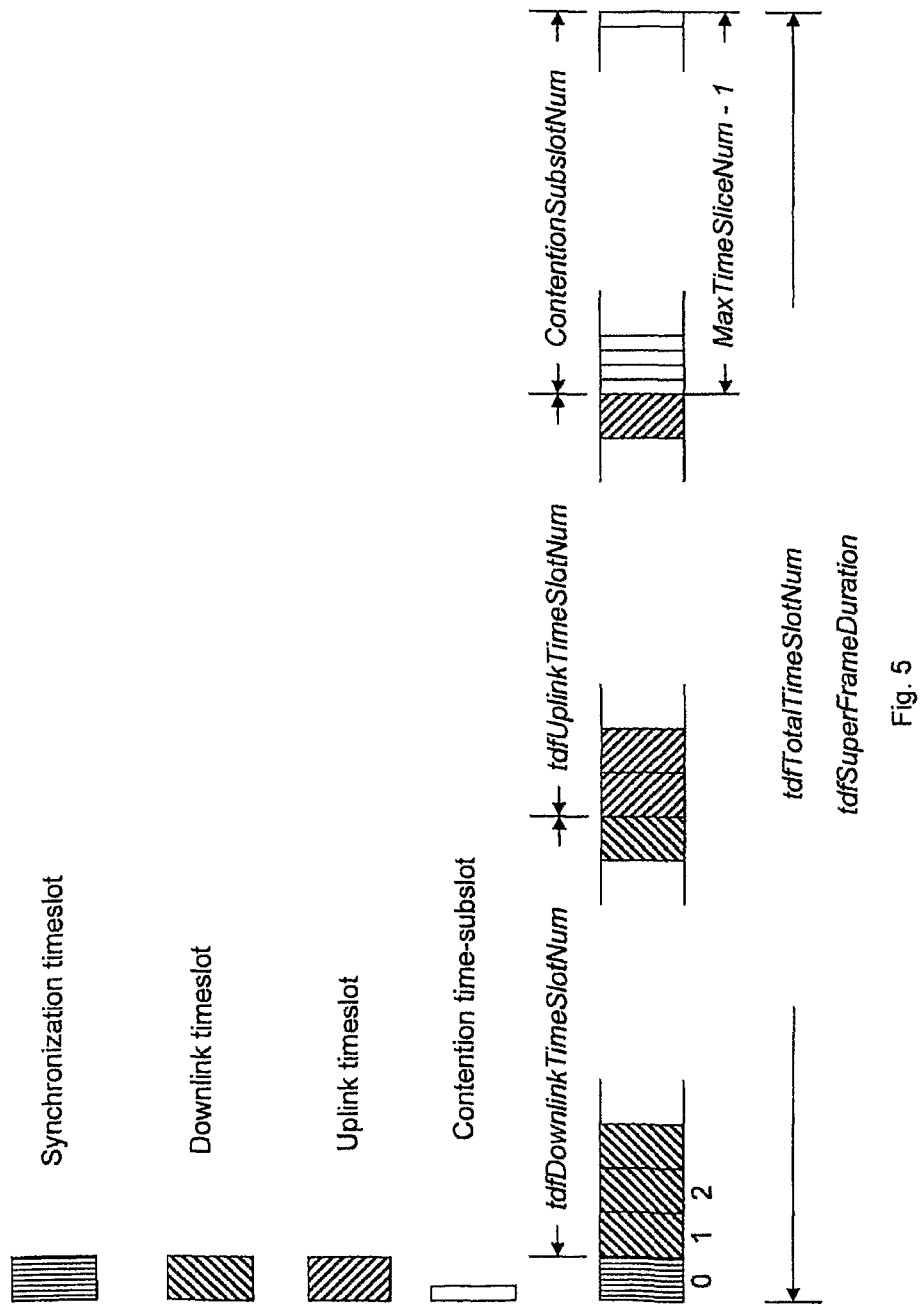
FIG. 5 illustrates an implementation of a TDF superframe structure.

FIG. 5 illustrates an example of a TDF superframe structure and the timeslot allocations for a typical TDF superframe when there are m STAs. As used herein timeslot and timeslice are interchangeable. As shown in FIG. 5, there is a total fixed number of timeslots tdfTotalTimeSlotNumber per TDF superframe, which includes one synchronization timeslot used to send clock synchronization information from an AP to one or more STAs, multiple tdfDownlinkTimeSlotNumber downlink timeslots used by the AP to transmit data and registration response management frames to the STAs, multiple tdfUplinkTimeSlotNumber uplink timeslots used by the registered STAs to send data and some management frames to an AP one after another and one contention timeslot used to send registration request for uplink timeslot allocation. The single contention timeslot is made up of multiple contention time-subslots. Except for the synchronization timeslot, all other timeslots, which are denoted common timeslots, have the same duration whose length equals the tdfCommonTimeSlotDuration. The value of tdfCommonTimeSlotDuration is defined to allow the transmission of at least one largest IEEE 802.11 PLCP (physical layer convergence protocol) protocol data unit (PPDU) in one normal timeslot for the highest data rate mode. The duration of synchronization timeslot, tdfSyncTimeSlotDuration, is shorter than that of the common timeslots, because the clock synchronization frame, which is transmitted from an AP to a STA in this timeslot, is shorter than an IEEE 802.11 data frame. The TDF superframe of FIG. 5 is an example of a format where the slot fields are ordered as synchronization timeslot, downlink timeslots, uplink timeslots and contention slot (multiple contention time-subslots). Other orderings of the slot fields are possible provided that the synchronization timeslot occurs first in the superframe. For example, following orderings are also possible; (i) synchronization slot, contention timeslot, uplink timeslots, downlink timeslots, (ii) synchronization timeslot, uplink timeslots, downlink timeslots, contention timeslot, and (iii) synchronization timeslot, contention timeslot, downlink timeslots, uplink timeslots.

As a result, the duration of one TDF superframe, defined as tdfSuperframeDuration, can be calculated by:

$$tdfSuperframeDuration = tdfSyncTimeSlotDuration + tdfCommonTimeSlotDuration * (tdfTotalTimeSlotNumber - 1)$$

The relationship between tdfTotalTimeSlotNumber, tdfUplinkTimeSlotNumber and tdfDownlinkTimeSlotNumber satisfies the following equality:

tdfTotalTimeSlotNumber=tdfUplinkTimeSlotNumber+tdfDownlinkTimeSlotNumber+2.

The synchronization timeslot is in the downlink direction.

Furthermore, the number of allocated uplink timeslots for the TDF STAs in a TDF superframe may change from one to tdfUplinkTimeSlotThreshold. Accordingly, the available downlink timeslots in a TDF superframe may change from (tdfTotalTimeSlotNumber-2) to (tdfTotalTimeSlotNumber-2-tdfMaximumUplinkTimeSlotNumber). When there is one STA which asks for an uplink timeslot, the AP deducts one or more timeslots from the available pool of downlink timeslots, and then allocate these timeslots to the STA, as long as the uplink timeslots number do not exceed tdfMaximumUplinkTimeSlotNumber following the allocation. The value of tdfMaximumUplinkTimeSlotNumber may vary in different implementations. But the maximum uplink slot number should be carefully chosen so that there is at least one downlink timeslot available for an associated STA in order to guarantee the quality of service (QoS) of the data service. Furthermore, all successive timeslots that are used by the same STA or AP for same direction transmission can be merged to send MAC frames continuously to avoid wasted time at the edge of these timeslots caused by the unnecessary conversion and guarding.

Once a STA is associated with an AP, the STA will transmit all outgoing frames/packets, including data, management and control frames/packets, during its own uplink timeslots. Uplink time slices for STAs are shared by all STAs associated with an AP, and every STA clearly knows which timeslots are its timeslots during which the STA sends its outgoing frames. This kind of mechanism can be applied in wired and wireless media, for example WLAN (Wireless Local Area Network), to support quality service for some QoS (Quality of Service) sensitive services, such as telephony and video streaming.

In one implementation, the tdfCommonTimeSlotDuration is about 300 us, which is enough for the STA to transmit at least one largest IEEE 802.11 PPDU in one common timeslot for 54 Mbps mode. There are total 62 timeslots per TDF superframe. In these timeslots, there are 20 uplink timeslots and 40 downlink timeslots. When there are 20 STAs, each STA can be guaranteed that it has access to 680 kbps of uplink data rate and shares 30 Mbps (40 continuous timeslots) of downlink data rate. When there are 30 STAs, each STA can be guaranteed that it has access to 680 kbps of uplink data rate and shares 22.5 Mbps (30 continuous timeslots) of downlink data rate. The tdfMaximumUplinkTimeSlotNumber is 30. Finally, the value of tdfSuperframeDuration, which is the total duration of 61 common timeslots and one synchronization timeslot, is about 18.6 ms and it can be defined to different value for different usage. For example, if there is only one STA, it can be guaranteed that it has 4 timeslots to achieve about 18 Mbps of uplink data rate and own 18 Mbps (4 continuous timeslots) of downlink data rate. In this way, the value of tdfSuperframeDuration, which is the total duration of nine data timeslots and one synchronization timeslot, is about 4 ms.

Frame/Message/Signal Formats

In the IEEE 802.11 specification, three major frame types exist; data frames/messages/signals, control frames/messages/signals, and management frames/message/signals. Data frames are used to exchange data from an access point to a station and vice-versa. Several different kinds of data frames exist, depending on the network. Control frames are used in conjunction with data frames to perform area clearing operations, channel acquisition and carrier-sensing maintenance functions, and positive acknowledgement of received data. Control and data frames work in conjunction to deliver data reliably between access points and stations. More specifically, one important feature in exchanging frames is that there is an acknowledgement mechanism, and accordingly an acknowledgement (ACK) frame for every downlink unicast frame. This exists in order to reduce the possibility of data loss caused by an unreliable wireless channel. Management frames perform supervisory functions. They are used to join and leave wireless networks and move associations from access point to access point. As used herein, the term "frames" may also be referred to as messages or signals in all cases. Equivalently, the term "frames/messages/signals" may also be used to denote equivalents.

In the TDF system, STAs passively wait for a synchronization frame/message/signal from the AP to identify a controlling AP. The synchronization frame is a frame of data located within the synchronizationslot (time slot 0) of FIG. 5. Since STAs wait for the AP to send a synchronization frame, there is no need for the typical probe request and probe response frames found in wireless implementations of the IEEE 802.11 standard. But, acknowledgement (ACK) frames/messages/signals are used to ensure the reliability of data frame delivery.

In the TDF protocol, only some of the useful IEEE 802.11 MSDU and MMPDU types for data are used in a cable medium. For example, the data subtype in data frame types is used to encapsulate the upper layer data and transmit it between access points and stations. New management frames are needed to accommodate a clock synchronization requirement in TDF system. To realize the functionality of uplink timeslot requests, allocations, and releases, four new kinds of management frames are defined. Table 1 defines the valid combinations of type and subtype of the added frames/messages/signals in the TDF protocol.

TABLE 1

New Management Frames for TDF Protocol

| Type description | Subtype description |
| --- | --- |
| Management | Synchronization |
| Management | Registration request |
| Management | Registration response |
| Management | Unregistration request |
| Management | Alive notification |

Access Point (AP) Searching and Clock Synchronization

The TDF protocol provides a distribution of timing information to all the STA nodes. A STA listens to a synchronization frame/message/signal in the synchronizationslot of the FIG. 5 superframe to decide if there is an active AP available. Once the STA enters TDF communications, the STA uses the synchronization frame to adjust its local timer, based on which the STA decides if it is its turn to send uplink frames. At any given time, the AP is the master and the STA is a slave in the synchronization procedure. If the STA has not received a synchronization frame from the associated AP for a predefined threshold period, which is defined as tdfSynchronizationCycle, the STA reacts as if the associated AP has stopped servicing the STA. In this instance, the STA stops communicating with the stopped AP and starts to look for an active AP by listening for the synchronization frame again.

In the TDF system, all STAs associated with the same AP synchronize to a common clock. The AP periodically transmits special frames called synchronization frames that contain the AP clock information to synchronize the STAs in its local network. In one embodiment, synchronization frames are generated for transmission by the AP once every TDF superframe time and sent in the synchronizationtimeslot of the TDF superframe.

Every STA maintains a local timing synchronization function (TSF) timer to ensure it is synchronized with the associated AP. After receiving a synchronization frame, a STA always accepts the timing information in the frame. If the STA TSF timer is different from the timestamp in the received synchronization frame from the AP, then the receiving STA sets its local timer according to the received timestamp value. Further, the STA may add a small offset to the received timing value to account for local processing by the transceiver.

STA Registration with an AP

Figure 6:
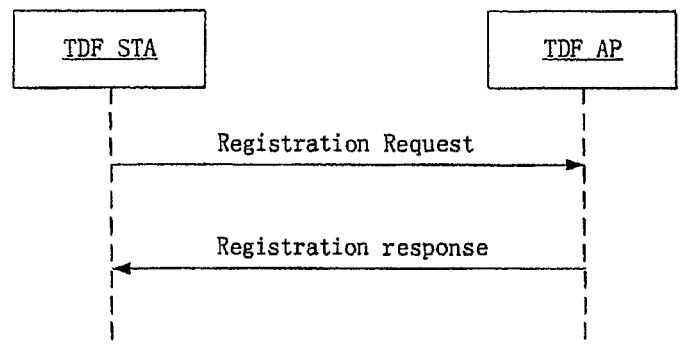
FIG. 6 illustrates an implementation of a registration procedure.

FIG. 6 illustratively describes the procedure of registration. Once a STA has acquired timer synchronization information from the synchronization frame, the STA learns when timeslot 0 occurs. If a STA is not associated with any active AP, the STA tries to register with an AP which sent a synchronization frame. The STA associates with an AP by sending Registration request frames to the AP during the contention timeslot, which is the second timeslot in a TDF superframe of FIG. 5. In one embodiment, the duration of the contention timeslot, which equals the tdfCommonTimeSlotDuration, and the registration request frame/message/signal structure are designed to allow for sending at least tdfMaximumUplinkTimeSlotNumber Registration request frames in one contention timeslot. Based on the design, the contention timeslot is divided into tdfMaximumUplinkTimeSlotNumber equal length sub-timeslots.

As soon as an STA detects an active, targeted AP, the STA chooses one sub-timeslot in the contention timeslot to send registration request frame to the AP. The purpose of this action is to reduce the chance of collision when there are many STAs starting at the same time and trying to register with the same AP simultaneously. A registration request may occur according to the following method:

A. Upon allocation of an uplink timeslot, a STA stores the allocated uplink timeslot number, defined as tdfAllocatedUplinkTimeSlot. The allocated uplink timeslot indicates the timeslots location in the whole pool of uplink timeslots and ranges from 1 to tdfMaximumUplinkTimeSlotNumber.

B. The AP allocates the same uplink timeslot to the same STA every time the STA requests an uplink timeslot.

C. When it is time to select a timeslot in which to send a registration request frame, if there is a stored tdfAllocatedUplinkTimeSlot value, the STA sets the timeslot number to tdfAllocatedUplinkTimeSlot. If there is no such value, the STA randomly chooses one sub-timeslot in the tdfMaximumUplinkTimeSlotNumber available timeslots. The STA then sends the registration request frame to the AP in the randomly chosen timeslot.

The STA lists all data rates it supports at that time and also sends some information such as the received signal carrier/noise ratio in the registration request frame. The STA may send several successive registration request frames with different supported data rates. After sending out the frame, the STA listens for the registration response frames/messages/signals from the AP.

After receiving a registration request frame from a STA, based on the following method, the AP sends different kinds of registration response frames back to the STA in the downlink timeslots.

A. If the already allocated uplink timeslots equal tdfMaximumUplinkTimeSlotNumber, the AP puts an uplinkTimeSlotUnavailable indicator in the frame body.

B. If the AP does not support any data rates listed in the supportedDataratesSet in the registration request management frame, the AP puts an unsupportedDatarates indicator in the frame body.

C. If there are uplink timeslots available to allocate and common data rates that both the AP and STA support, the AP allocates one uplink timeslot and chooses a suitable common data rate according to information such as carrier/noise ratio in the STA's registration request frame, and then sends a registration response frame to the STA. The frame/message/signal body contains the allocated uplink timeslot and the chosen data rate information. After a successful registration process, the TDF STA and TDF AP reach an agreement on which uplink timeslot and data rate to use.

Fragmentation/Defragmentation

In TDF protocol, the timeslot duration for the transmission of MSDU is fixed as tdfCommonTimeSlotDuration. For some data rates, when the MSDU's length is more than a threshold, it is impossible to transmit it in a single timeslot. So when a data frame for uplink transmission is longer than the threshold, which is defined as tdfFragmentationThreshold and varies depending on different data rates, the data frame is fragmented before transmission. The length of a fragment frame is an equal number of octets (tdfFragmentationThreshold octets), for all fragments except the last, which may be smaller. After fragmentation, the fragmented frames are put into the outgoing queue for transmission to the AP. This fragmentation procedure may run in the TDF frame transmission entity or in the upper layer by using the tdfFragmentationThreshold dynamically set in the TDF frame transmission entity.

At the AP end, each fragment received contains information to allow the complete frame to be reassembled from its constituent fragments. The header of each fragment contains the following information that is used by the AP to reassemble the frame:

A. Frame type

B. Address of the sender, obtained from the Address 2 field

C. Destination address

D. Sequence control field: This field allows the AP to check that all incoming fragments belong to the same MSDU, and the sequence in which the fragments should be reassembled. The sequence number within the sequence control field remains the same for all fragments of a MSDU, while the fragment number within the sequence control field increments for each fragment.

E. More fragments indicator: Indicates to AP that this is not the last fragment of the data frame. Only the last or sole fragment of the MSDU has this bit set to zero. All other fragments of the MSDU shall have this bit set to one.

The AP reconstructs the MSDU by combining the fragments in the order of fragment number subfield of the sequence control field. If the fragment with the more fragments bit set to zero has not yet been received, the AP knows that the frame is not yet complete. As soon as the AP receives the fragment with the more fragments bit set to zero, it knows that no more fragments may be received for the frame. The AP can issue retransmission requests to the STA if a received fragment contains errors or is incomplete.

The AP maintains a receive timer for each frame being received. There is also an attribute, tdfMaxReceiveLifetime, which specifies the maximum amount of time allowed to receive a frame. The receive timer starts upon the reception of the first fragment of the MSDU. If the receive frame timer exceeds tdfMaxReceiveLifetime, then all received fragments of this MSDU are discarded by the AP. If additional fragments of a directed MSDU are received after its tdfMaxReceiveLifetime is exceeded, those fragments are discarded.

Uplink Transmission

As stated above, uplink is defined as the transfer of information from a STA to an AP. After receiving the registration response frame from the AP, the STA analyzes the frame body to see if it is granted an uplink timeslot. If not, it pauses and applies for the uplink timeslot later. If granted, the STA starts to transmit uplink traffic during the assigned timeslot using the data rate indicated in the registration response frame.

At the beginning of the uplink transmission during the assigned timeslot, the STA sends the first frame in its outgoing queue (buffer) to the AP if there is at least one outgoing frame in the queue (buffer). After that, the STA checks the second uplink frame's length and evaluate if it is possible to send it during the remaining duration in the assigned timeslot. If not, it stops the uplink transmission procedure and waits to send it in the assigned timeslot during the next TDF superframe. If yes, the STA immediately sends the second frame to the destination AP. The sending procedure continues to run in this way until the assigned timeslot has ended, or until there are no more uplink frames to transmit.

Downlink Transmission

As stated above, downlink is defined as the transfer of information from an AP to a STA. In the entire TDF communication procedure, the total number of downlink timeslots may change dynamically due to the changing number of associated STAs. When the AP prepares to send frames to the associated STAs, it compares the time left in the remaining downlink timeslots with the duration needed for transmitting the specific downlink frame using the agreed data rate. Then, based on the result, it decides if the frame should be transmitted with the specific data rate during this TDF superframe. Furthermore, the AP does not need to fragment downlink frames.

When it is not time for the associated STA to send uplink traffic, the STA listens to the channel for the possible downlink frames addressed to it.

Unregistration

Figure 7:
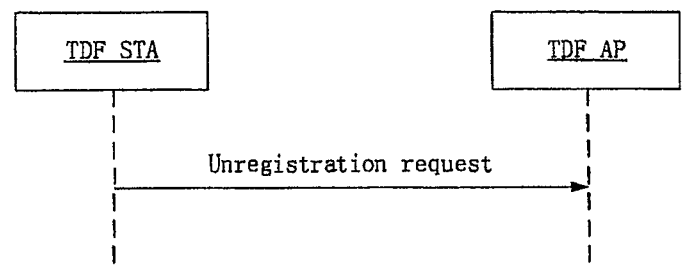
FIG. 7 illustrates an implementation of an unregistration procedure.

As shown in FIG. 7, if the STA decides to go off-line and stop TDF communications, the STA sends an unregistration request frame to the associated AP during its uplink timeslot, in order to inform the AP to release the allocated uplink timeslot resource. After receiving the unregistration request frame, the AP releases the uplink timeslot assigned for the STA and puts it into a free timeslot pool for future use. The released timeslot may be used in either an uplink timeslot period or in a downlink timeslot period depending on system needs.

Alive Notification

Figure 8:
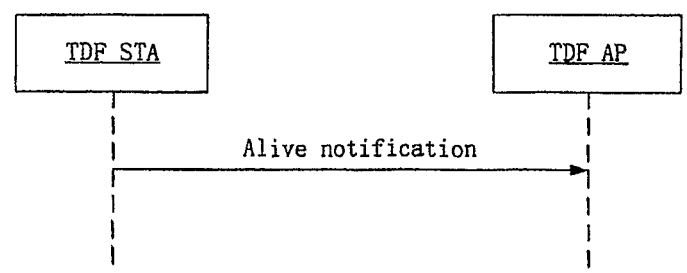
FIG. 8 illustrates an implementation of an alive notification procedure.

Referring to FIG. 8, the STA reports its aliveness by sending an alive notification frame periodically to AP during its uplink timeslot period. This is performed to allow the AP to sense if a STA unexpectedly crashes or shuts down so that the AP can release the AP resources as soon as possible. If there is no alive notification frame for a predefined threshold period which is denoted tdfAliveNotificationCycle, the associated AP acts as if the STA is offline, and then releases the uplink timeslot allocated for the STA. This result is similar to receiving an unregistration request frame from the STA wherein a once-allocated timeslot is returned to the pool of available time slots for future use.

In one embodiment, in order to ensure coexistence and interoperability on multirate-capable STAs, a set of rules is followed by all STAs:

A. The synchronization frames are transmitted at the lowest rate in the TDF basic rate set so that they are understood by all STAs.

B. All frames with destination unicast addresses are sent using the supported data rate selected by the registration mechanism. No station transmits a unicast frame at a rate that is not supported by the receiver station.

C. All frames with destination multicast address are transmitted at the highest rate in the TDF basic rate set.

Packet/Frame Transfer Operation Example

A description of FIGS. 9-20 follows to further describe the operational flow of information in the system described by FIGS. 1-8. Of course, the features and aspects of the implementations of FIGS. 9-20 may be used with other systems. As described above, a TDF protocol can replace the conventional IEEE 802.11 compatible DCF (distributed coordination function) or PCF (point coordination function) mechanism.

Figure 9:
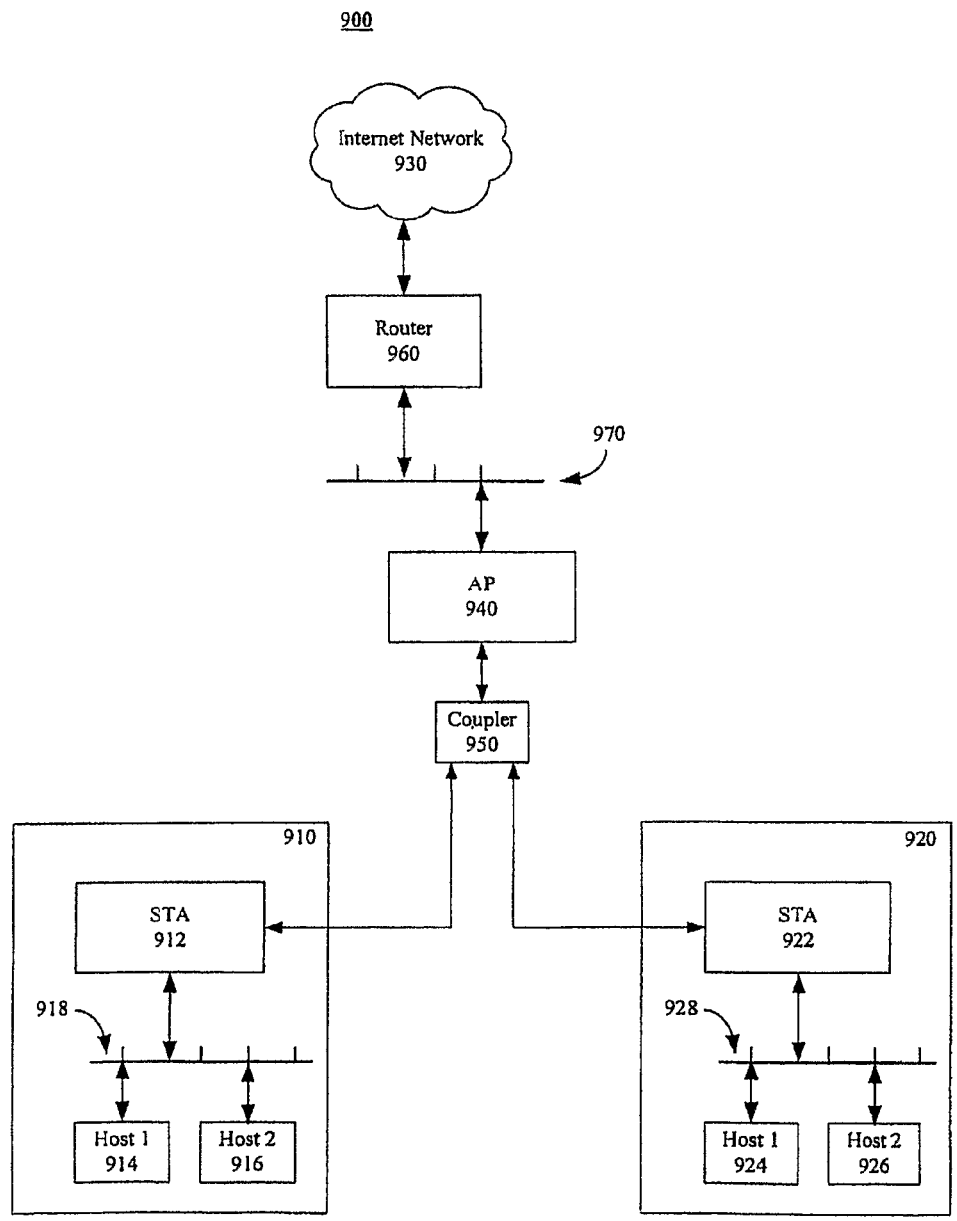
FIG. 9 includes a system diagram that depicts an implementation of a TDF network.

Referring to FIG. 9, a typical TDF network example 900 is shown. The network 900 provides a connection from user homes 910 and 920 to the Internet (or another resource or network) 930. The user homes 910 and 920 connect through an access point (AP) 940 over a cable system coupler 950. The AP 940 may be located, for example, in a neighborhood of the homes 910 and 920, or in an apartment building that includes the homes (apartments, for example) 910 and 920. The AP 940 may be owned by a cable operator, for example. The AP 940 is further coupled to a router 960 over a LAN system 970. The router 960 is also coupled to the Internet 930.

As should be clear, the term "coupled" refers to both direct connections (no intervening components or units) and indirect connections (one or more intervening components and/or units, such as splitters, amplifiers, repeaters, interface converters, etc.). Such connections may be, for example, wired or wireless, and permanent or transient.

The user homes 910 and 920 may have a variety of different configurations, and each home may be differently configured. As shown in the network 900, however, the user homes 910 and 920 each include a station (referred to as a modem or STA) 912 and 922, respectively. The modems 912, 922 are coupled to a first host (host1) 914, 924, and a second host (host2) 916, 926, over an LAN network 918, 928, respectively. Each host 914, 916, 924, and 926 may be, for example, a computer or other processing device or communication device. There are various ways in which the network 900 may allow multiple hosts (for example, 914, 916, 924, and 926) to connect to the router 960. Four implementations are discussed below, considering only the modem 912 and hosts 914 and 916, for simplicity.

In a first method, the modem 912 acts as another router. The hosts 914 and 916 are identified by their IP addresses, and the modem 912 routes IP packets from the hosts 914 and 916 to the router 960. This method typically requires the modem 912 to run router software, which requires additional memory and increased processing power.

In a second method, the modem 912 acts as a bridge. The modem 912 and the AP 940 use the standard wireless distribution system (WDS) mechanism to convey layer 2 packets to the router 960. The hosts 914 and 916 are identified by their media access control (MAC) addresses. This method is part of the IEEE 802.11 standard and can serve multiple hosts simultaneously. However, not all APs and modems support WDS with enhanced security.

In a third method, the modem 912 uses MAC masquerade to change the source MAC address of LAN packets/frames (the source being one of the hosts 914 and 916) to its own MAC address. So from the point of view of the router 960, the router 960 only sees the modem 912. The modem 912 can only serve one host at one time with this method.

In a fourth method, the modem 912 uses encapsulation, as described in further detail below. Each of the above methods has advantages and disadvantages, and these advantages and disadvantages may vary depending on the implementation. However, the encapsulation method provides particular advantages in that it generally allows the modem to be simpler by not requiring that the modem run router software. Also, the encapsulation method does not typically introduce security problems and it can serve multiple hosts at one time.

Additionally, the encapsulation method avoids the large overhead possibly associated with the first three methods, which transfer each packet from a host by using a single WLAN-formatted packet. In the present TDF environment, a WLAN-formatted packet is used as a convenient format for transferring information in the hardwired (non-RF) TDF cable system of FIG. 9. Thus, the first three methods incur the overhead of the WLAN packet for every packet transferred from a host, and the throughput is correspondingly reduced. Such inefficiency is typically aggravated in the TDF environment. In the TDF environment, the duration of the timeslot is fixed, and the timeslot is designed to allow only one largest WLAN frame to transmit in one slot. Thus, only one host packet can be transmitted in each timeslot.

Accordingly, the encapsulation method can provide one or more of a variety of advantages. Such advantages include, for example, simpler router design and operation, increased security, serving multiple hosts, and increased efficiency and throughput. In an embodiment that includes the encapsulation method, multiple LAN packets are included into one WLAN-formatted packet (WLAN packet). The WLAN packet is as big as the maximum length allowed by the TDF timeslot. The entity that receives the encapsulated packets (for example, an AP) decapsulates the WLAN packet into individual LAN packets and send them to the router. For communication in the reverse direction, a modem (STA) decapsulates a WLAN packet and send the individual LAN packets to the host(s).

STA and AP Example

Figure 10:
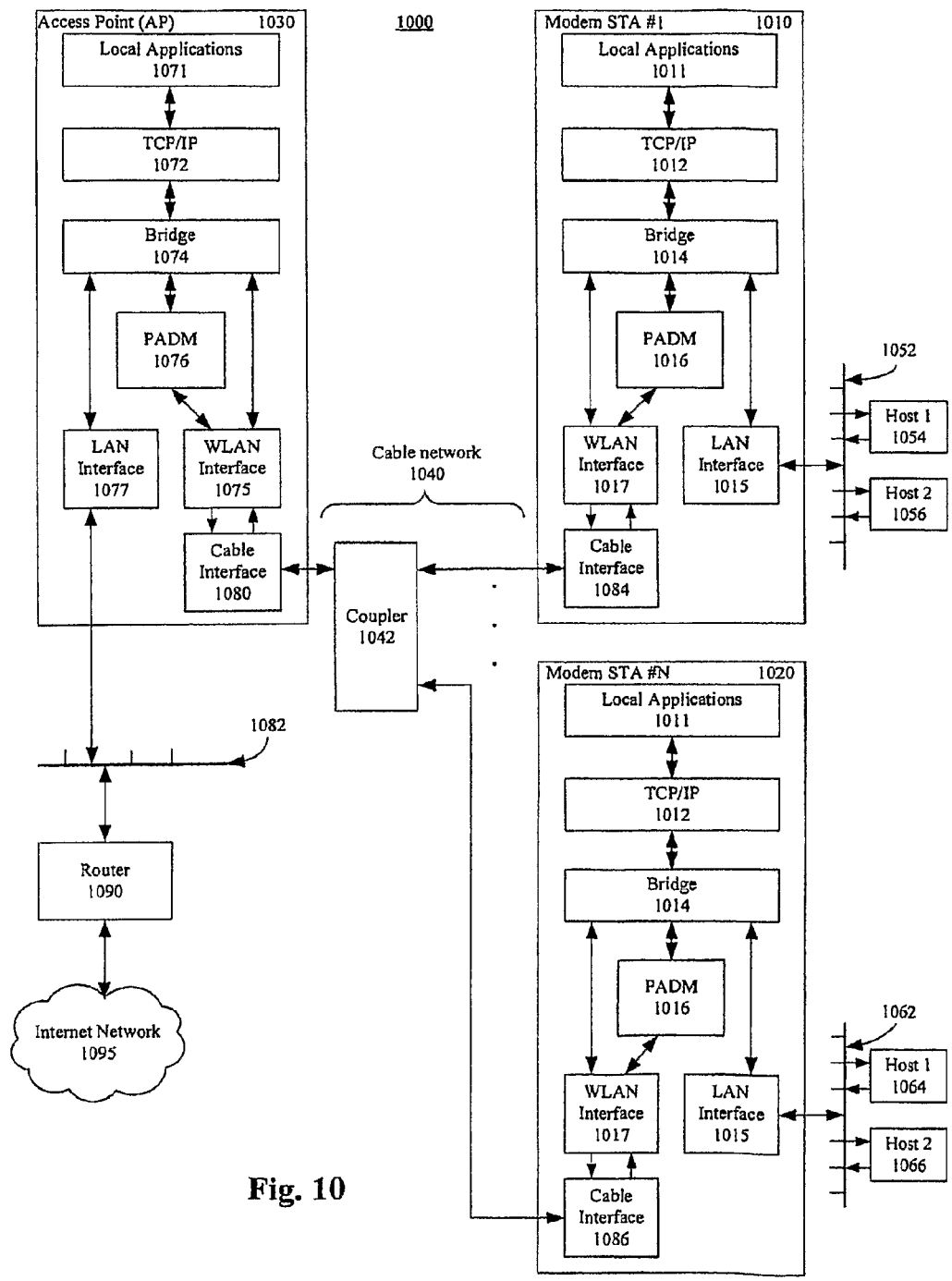
FIG. 10 includes a block diagram of an implementation of an AP and a modem from FIG. 9.

FIG. 10 is an illustration 1000 that includes multiple modems (STAs), two of which are explicitly shown, and an AP. In the illustration, up to N modems may be connected to an AP via the cable network. The illustration includes a modem #1 1010, a modem #N 1020, and an AP 1030, with each of the modems 1010 and 1020 coupled to the AP 1030 over a cable network 1040 via coupler 1042. The cable network coupler 1042 may be a signal splitter, amplifier, repeater, or other type of coupler as is well known in the art for cable systems. Other implementations may use separate cable networks for each of the modems depending on alternate configurations of an interconnecting cable network. Modems #1 1010 and #N 1020 are shown as having local area network (LAN), such as Ethernet, Appletalk, or Arcnet, and cable drive interfaces for external use. This configuration is only an example of the types of interfaces that the modem may provide for a user.

FIG. 10 depicts both functional and physical interfaces as described below. The modems 1010 and 1020, and the AP 1030 include functional components of the same name, although some of the external connections are different and the components themselves perform different functions for a modem and for an AP. Thus, a commonly depicted unit function can serve in both a modem and an AP. However, it should be clear that different units could be designed for a modem and for an AP, with the different units performing only those functions required of a modem or an AP, respectively.

It is also understood that the functions and interfaces shown in modems 1010, 1020, and 1030 may be implemented by hardware, firmware or software, or any combination of hardware, firmware, and software. For example, modem 1010 may include a processing unit (not shown) that provides fixed or programmable co-ordination of the functions and interfaces shown in FIG. 10 and other Fig.s. Those of skill in the art will recognize that a central processing unit, multiple processors, application specific integrated circuits, logic control circuits, analog drive circuits for the interfaces, and power supplies may be used in combination to realize the functionality of the devices of FIG. 10 and the other Fig.s presented herein.

The modem 1010 includes a local applications layer 1011, followed by a TCP/IP layer 1012, followed by a bridge 1014. The bridge 1014 is coupled to a LAN interface 1015, a packet aggregation/deaggregation module (PADM) 1016, and a WLAN format interface 1017. The PADM 1016 is also coupled to the WLAN format interface 1017. A cable interface 1084 couples the WLAN format interface 1017 to the external cable network 1040 between the modem 1010 and the AP 1030. The LAN interface 1015 is coupled to an LAN network 1052, that is coupled to a first host (host1) 1054 and a second host (host2) 1056.

The modem 1020 is analogous to the modem 1010. However, the modem 1020 is coupled to a LAN network 1062, and the LAN network 1062 is coupled to a first host (host1) 1064 and a second host (host2) 1066. The components of the modem 1020 are shown as being similar to those of the modem 1010. However, it should be clear that various configuration parameters, for example, are different when the modems 1010 and 1020 are set up and operational.

The AP 1030 includes a local applications layer 1071, followed by a TCP/IP layer 1072, followed by a bridge 1074. The bridge 1074 is coupled to an Ethernet interface 1077, a PADM 1076, and a WLAN format interface 1075. The PADM 1076 is also coupled to the WLAN format interface 1075. A cable interface 1084 couples the WLAN format interface 1075 to the external cable network 1040 between the AP 1030 and the downstream modems 1010 and 1020. The LAN interface 1077 is coupled to an Ethernet network 1082, which in turn is coupled to a router 1090. The WLAN format interfaces 1017 and 1075 are communicatively coupled to each other via cable interfaces 1084 and 1080 and the cable network 1040. The router 1090 is further coupled to the Internet 1095. Thus, a connection exists between the hosts 1054, 1056, 1064, 1066, and the Internet 1095.

The various local application layers (1011, 1071) are standard layers for running local applications and interfacing with other layers in the architecture. The various TCP/IP layers (1012, 1072) are standard layers for running TCP/IP and for providing the services typically provided by such layers, including interfacing to other layers in the architecture. The various LAN interlaces (1015, 1077) are standard units for interfacing to/from a LAN network. Such interfaces 1015, 1077 transmit and receive LAN packets and operate according to a protocol, such as an Ethernet protocol.

The various WLAN format interfaces (1017, 1075) are units for formatting frames used in communication across cable network 1040 via cable interfaces 1084 and 1080. Such WLAN format interfaces 1017, 1075 transmit and receive WLAN formatted packets and operate according to the WLAN protocol. However, the WLAN interfaces 1017, 1075 are actually coupled, in the illustration 1000, to a cable network 1040 via cable interfaces 1084 and 1080 rather than using wireless communication.

The LAN 1015, 1077, WLAN format interfaces 1017, 1075, and cable interfaces 1084, 1080 may be implemented, for example, in hardware such as plug-in cards for a computer. The interfaces may also largely be implemented in software such as a program that performs the functions of the formatting interface using instructions that are implemented by a processing device. Drivers for such software formatting functions would however be implemented in hardware for the LAN and cable interfaces. Overall, an interface generally includes a portion for receiving the actual signal (for example, a connector) and for buffering the received signal (for example, a transmit/receive buffer), and typically a portion for processing the signal (for example, all or part of a signal processing chip).

The various bridges (1014, 1074) are units that forward packets between an Ethernet interface and a WLAN formatting interface. A bridge may be software or hardware implemented, or may only be a logical entity. Standard implementations for a bridge, or any other function within an AP or STA, include a processing device (such as an integrated circuit, single or multiple processing units) or a set of instructions running on a processing device (such as a processor running bridge software).

The PADMs 1016 and 1076 perform a variety of functions, including packet encapsulation and decapsulation, which are further described below. The PADMs 1016 and 1076 may be implemented in, for example, software, hardware, firmware, or some combination thereof. Software implementations include, for example, a set of instructions such as a program for running on a processing device. Such instructions may be embodied in a computer-readable medium. Hardware implementations include, for example, a dedicated chip such as an application specific integrated circuit (ASIC) or a programmable device such as a programmable gate array (PGA) which may even include firmware instructions supporting digital logic elements.

Figure 11:
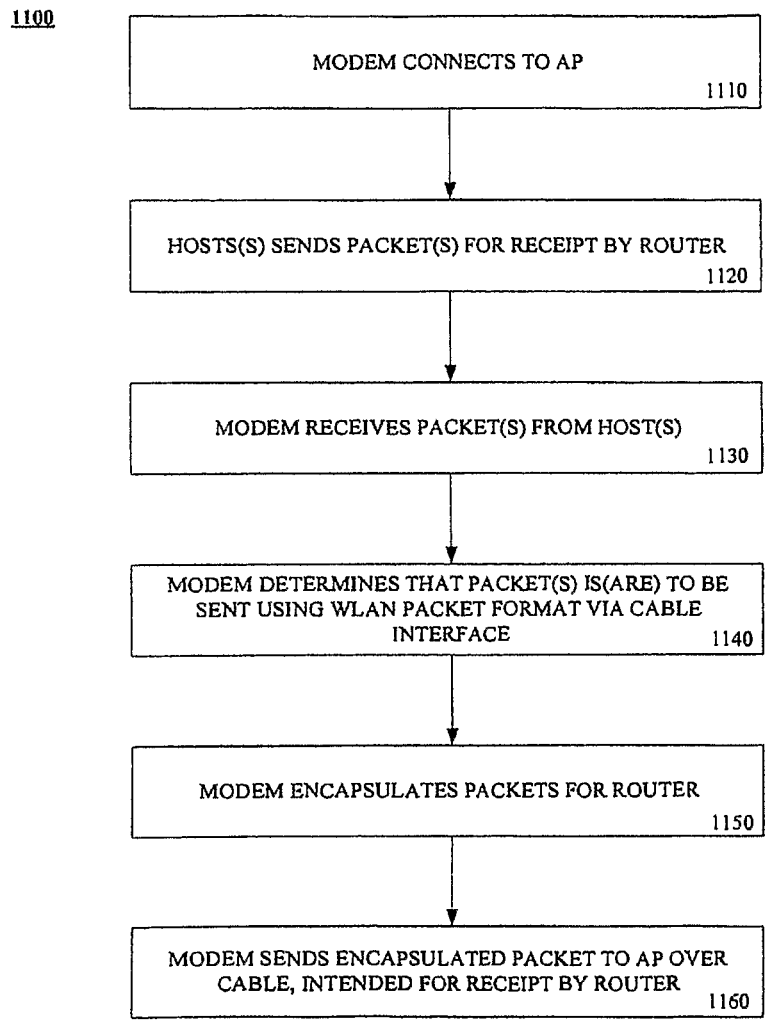
FIG. 11 includes a flow diagram of an implementation of an uplink transmission process.

Referring to FIG. 11, a process 1100 depicts a process for transferring frames/packets from a host to an AP via a modem or STA. The frames/packets are transmitted from the modem for receipt by an AP, and for eventual delivery to a router and then a final destination in an IP core network. This process 1100 is also referred to as a modem to AP uplink transmission process. The process 1100 includes the modem connecting to the AP (1110) using, for example, a registration process previously described. Such processes may also include, for example, standard WLAN protocols including authentication and association operations.

The process 1100 then includes one or more hosts sending one or more frames/packets (1120) to the modem, and the modem receiving the sent frames(s)/packet(s) (1130). Note that the sent frames/packets are for receipt by a router which delivers the frames/packets to the final destination(s). In the implementation of FIG. 10, the modem 1010 receives the sent frames/packets, from one or more of the hosts 1054 and 1056, over the LAN network 1052 through the LAN interface 1015.

The modem then determines that the frame(s)/packet(s) is (are) to be sent via a WLAN formatting interface (1140) to the AP via the cable interface. The modem makes this determination (1140) by recognizing that the router is accessed using the cable interface and the WLAN format interface, as opposed, for example, to being accessed over another interface (such as a wireless interface, not shown). In the implementation of FIG. 10, the modem 1010 sends the received frame(s)/packet(s) to the bridge 1014, and the bridge 1014 makes this determination (1140).

The modem then encapsulates multiple frames/packets for the router, including the one or more received frames/packets (1150). The encapsulation (1150) may include frames/packets received from multiple hosts, for example, from hosts 1054 and 1056 in the implementation of FIG. 10. Further, the encapsulation may include the frame(s)/packet(s) received in operation 1130 and frames/packets received earlier and stored in a queue.

In an implementation that does not encapsulate multiple frames/packets, the implementation may use a bridge to map LAN frames/packets to individual WLAN packets, encapsulating each LAN frame/packet individually. Such encapsulation may, for example, include the entire LAN packet as a data portion of a WLAN packet and add an additional WLAN header.

Further, implementations that do not encapsulate multiple frames/packets need not even encapsulate the individual LAN frames/packets. Rather, such implementations may transform individual LAN frames/packets into individual WLAN packets by, for example, replacing the LAN header with a WLAN header and by optionally adding one or more additional fields.

Figure 12:
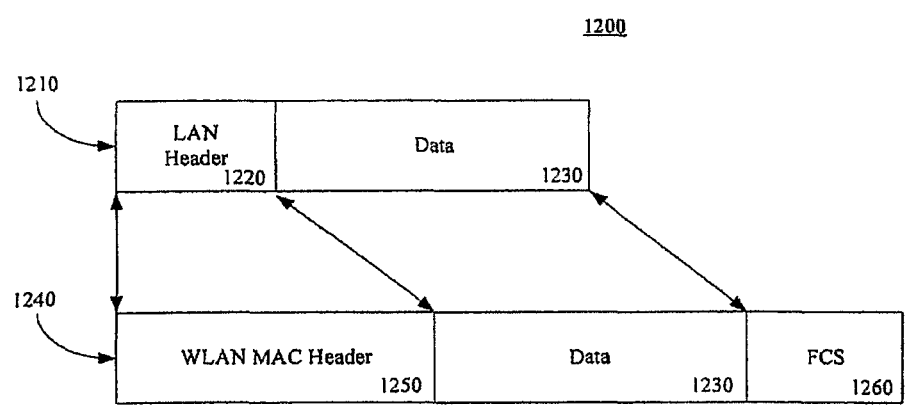
FIG. 12 includes a diagram of an implementation of a one-to-one mapping between an Ethernet packet and a WLAN packet.

For example, referring to FIG. 12, a transformation 1200 is shown that receives an LAN frames/packet 1210 including a LAN header 1220 and a data portion 1230. The transformation 1200 produces a WLAN packet 1240 that includes a WLAN header 1250, the data portion 1230, and a frame check sequence (FCS) 1260. However, implementing operation 1150 includes encapsulating multiple LAN frames/packets into a single WLAN packet. One implementation of operation 1150 is illustrated in FIG. 13.

Figure 13:
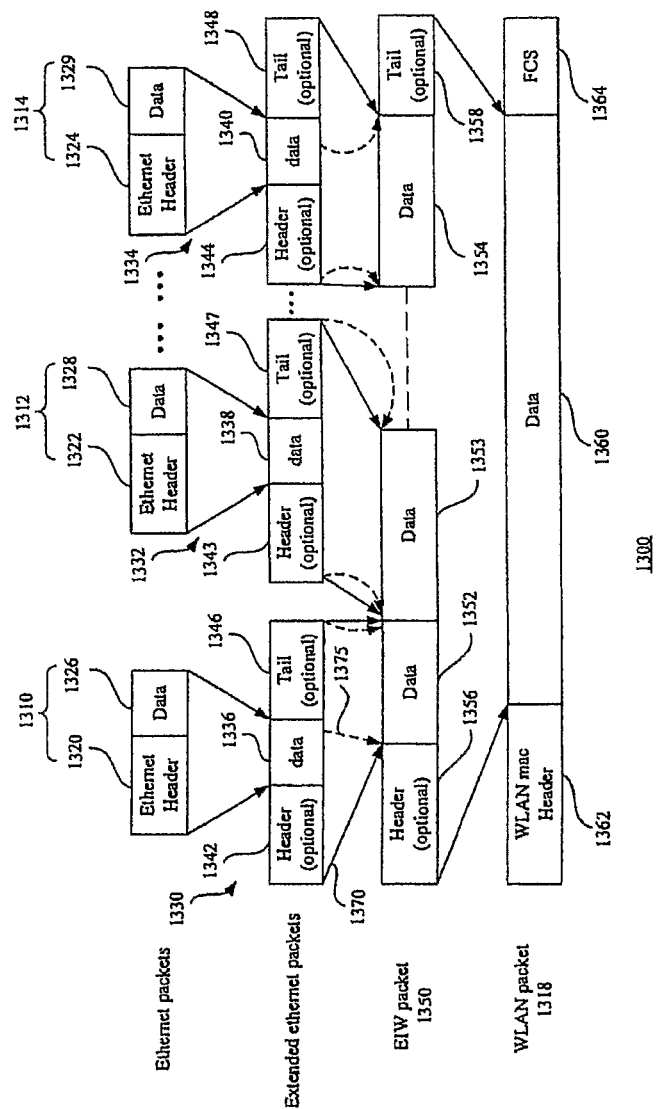
FIG. 13 includes a diagram of an implementation of a transformation between multiple Ethernet packets and a single WLAN packet.

FIG. 13 is depicts an example transformation from LAN frames/packets, depicted as specific Ethernet packets, to a WLAN packet. As noted before, an Ethernet packet is a specific form of a LAN frame/packet. Accordingly, FIG. 13 is applicable to any type of LAN packet. In FIG. 13, a transformation 1300 receives multiple Ethernet packets, including Ethernet packets 1310, 1312, and 1314, and produces a single WLAN packet 1318. The Ethernet packets 1310, 1312, and 1314 each include an Ethernet header 1320, 1322, and 1324, respectively, and a data portion 1326, 1328, and 1329, respectively. The Ethernet packets 1310, 1312, and 1314 may originate from the same host, or from different hosts. Further, although the Ethernet packets 1310, 1312, and 1314 are being encapsulated for sending to a router, the final destinations of the Ethernet packets 1310, 1312, and 1314 may be different. For example, each of the Ethernet packets 1310, 1312, and 1314 may be destined for different Internet sites with which the one or more hosts are communicating (or attempting to communicate). The transformation 1300 is shown as including two intermediate operations. However, other implementations do not perform any intermediate operations, and still other implementations perform more intermediate operations.

The first intermediate operation is transforming the Ethernet packets into extended Ethernet packets. The Ethernet packets 1310, 1312, and 1314 are transformed into extended Ethernet packets 1330, 1332, and 1334, respectively. In the transformation 1300, the entire Ethernet packets 1310, 1312, and 1314 are included as data portions 1336, 1338, and 1340, respectively, of the extended Ethernet packets 1330, 1332, and 1334. The extended Ethernet packets 1330, 1332, and 1334 also include, respectively, optional headers 1342, 1343, and 1344, as well as optional tails/trailers 1346, 1347, and 1348. The headers 1342, 1343, and 1344, and the tails/trailers 1346, 1347, and 1348 may include a variety of different pieces of information, whether typical for headers/tails/trailers or not, such as, for example, packets numbers, acknowledgment and retransmission information, addresses for sources and/or destinations, and error checking information.

The second intermediate operation includes transforming the extended Ethernet packets into a single "Ethernet in WLAN" (EIW) packet 1350. The EIW packet 1350 includes data portions for each of the extended Ethernet packets. Two possible transformations are shown. The first is illustrated by solid arrows 1370 and the second is illustrated by dashed arrows 1375.

As shown by the solid arrows 1370 in the transformation 1300, data portions 1352, 1353, and 1354 correspond, respectively, to the included extended Ethernet packets 1330, 1332, and 1334. The EIW packet 1350 further includes an optional header 1356 (also referred to as an EIW header) and an optional tail/trailer 1358, which may include, for example, any of the information previously described for headers/tails/trailers. If no header or tail/trailer is inserted into an extended Ethernet packet, then the data portion of the extended Ethernet packet (for example, the data portion 1336) becomes the data portion of the EIW packet (for example, the data portion 1352). Further, even if a header or tail/trailer is inserted into the extended Ethernet packet, an implementation may discard/ignore the header or tail/trailer when forming the EIW packet. In either of these cases, the data portions of the extended Ethernet packet are included in the EIW frame/packet.

As shown by the dashed arrows 1375 in the transformation 1300, the data portions 1352, 1353, and 1354 need not correspond, respectively, to the extended Ethernet packets 1330, 1332, and 1334. That is, a data portion of an EIW packet need not contain an entire extended Ethernet packet. As indicated by the dashed arrows 1375, an extended Ethernet packet may be divided into the data portions of two EIW packets.

More specifically, the implementation illustrated by the dashed arrows 1375 shows that (1) a second part of the extended Ethernet packet 1330 is put into the data portion 1352 of the EIW packet 1350, (2) the entire extended Ethernet packet 1332 is put into the data portion 1353 of the EIW packet 1350, and (3) a first part of the extended Ethernet packet 1334 is put into the data portion 1354 of the EIW packet 1350. Thus, in one scenario for the EIW packet 1350, (1) the first data portion 1352 contains a partial extended Ethernet packet, and (2) the last data portion 1354 contains a partial extended Ethernet packet, while (3) the middle data portions (1353 and any other data portions not explicitly shown) contain complete extended Ethernet packets. Although not shown, it should be clear that the first part of the extended Ethernet packet 1330 may be placed in a data portion of a previous EIW packet, and (2) a second part of the extended Ethernet packet 1334 may be placed in a data portion of a subsequent EIW packet.

In the final stage of the transformation 1300, the EIW packet 1350 is included as a data portion 1360 in the WLAN packet 1318. The WLAN packet 1318 also includes a WLAN MAC header 1362 and an FCS 1364. As should be clear, not all implementations use all of the optional headers and tails/trailers, nor even use all (or any) of the optional intermediate operations (also referred to as stages). For example, other implementations only copy part of the extended Ethernet packets into the EIW packet, in order to fit more original data (for example, data portions 1326, 1328, and 1329) into a fixed-duration timeslot. As should be clear, the determination of which headers and tails/trailers are used, as well as how many intermediate operations are included may vary for each implementation based on design goals and constraints.

Figure 14:
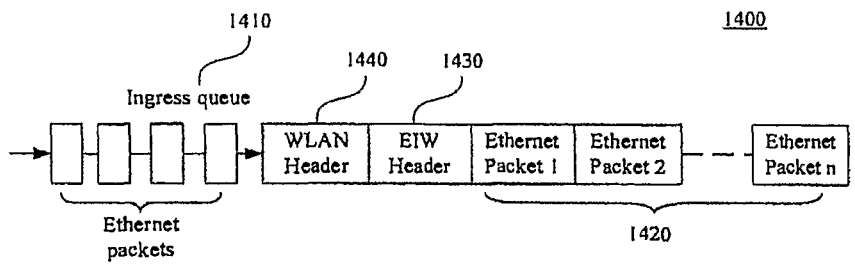
FIG. 14 includes a diagram depicting packet flow in the transformation of FIG. 13.

As with FIG. 13, FIG. 14 utilizes the specific example of an Ethernet packet as a LAN frame/packet. Non-Ethernet packets could also be used. Referring to FIG. 14, a diagram 1400 shows how one implementation of a PADM encapsulates Ethernet packets. The PADM maintains an ingress queue 1410 into which each incoming Ethernet packet is placed. The PADM concatenates the Ethernet packets into a string 1420, and adds an EIW header 1430 and a WLAN header 1440. Depending on the information included in the headers 1430 and 1440, these headers 1430 and 1440 may be constructed ahead of time or after concatenating the Ethernet packets. For example, at least one implementation includes in the EIW header 1430 a number representing the number of Ethernet packets in the string 1420. Given that Ethernet packets may have a variable length, this number is not typically available until after the Ethernet packets have been assembled into the string 1420. As should be clear, the headers 1430 and 1440 may be defined to accommodate the needs of a particular implementation.

Figure 15:
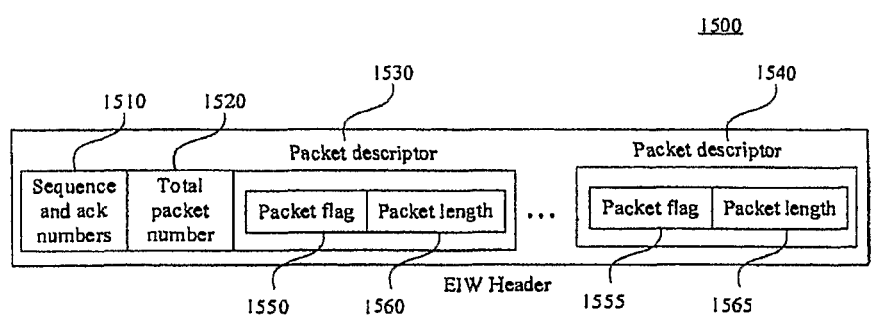
FIG. 15 includes a diagram of an implementation of an EIW header from FIG. 14.

Referring to FIG. 15, a format 1500 of one implementation of an EIW header is shown. The format 1500 includes a field 1510 for sequence and ack numbers, a total packet number 1520, and a series of packet descriptors, including one descriptor for each Ethernet packet encapsulated in the WLAN packet. Accordingly, a variable number of packet descriptors are envisioned, as indicated by the ellipsis in FIG. 15. Packet descriptors 1530 and 1540 are shown, with each of the packet descriptors 1530 and 1540 including a packet flag (1550 and 1555, respectively) and a packet length (1560 and 1565, respectively).

The sequence number (1510) provides a sequence identifier for the encapsulated data, which allows the recipient to acknowledge receipt of the transmission. The ack number provides an acknowledgement for previously received data. The total packet number is the number of Ethernet packets that are encapsulated in the WLAN packet.

The packet flags (1550, 1555) indicate whether the associated Ethernet packet is a complete packet. Given that the timeslot has a fixed duration, it is possible that an entire Ethernet packet might not fit into a given WLAN packet. Accordingly, in particular implementations it is expected that the last Ethernet packet may typically be shorter in any given WLAN packet. The packet length (1560, 1565) indicates the length of that particular Ethernet packet.

Continuing with the process 1100 of FIG. 11, using the implementation of FIG. 10, the operation 1150 may be performed by, for example, the PADM 1016 of the modem 1010. Other implementations may perform the operation 1150 in, for example, the bridge, the LAN interface, the WLAN format interface, another intermediary component other than the PADM, a component above the bridge, or in a combination of components. As should be clear, the component(s) performing the operation 1150 may be implemented in, for example, software (such as a program of instructions), hardware (such as an IC), firmware (such as firmware embedded in a processing device), or a combination. Additionally, the PADM may be located in a different position within the modem (such as, for example, above the bridge or between the Ethernet interface and the bridge), within one of the interfaces or the bridge, and/or be distributed among multiple components.

The process 1100 further includes the modem sending the encapsulated packet to the AP over a cable network (1160). The sent packet is intended for receipt by the router. The cable network may include, for example, a coaxial cable, a fiber optic cable, or other wired transmission medium as well as couplers, splitters, amplifiers, repeaters, interface converters, and the like as needed for reliable distribution of information packets.

In one embodiment, when a modem's uplink timeslot arrives, the modem gathers packets from the ingress queue and puts them into one WLAN packet. The WLAN packet may not be bigger than the biggest packet that the timeslot allows. Conversely, when the timeslot arrives, if the WLAN packet is not big enough to fill the duration of the fixed timeslot, then one implementation still sends the (smaller) WLAN packet, whereas another implementation sends NULL data.

Figure 16:
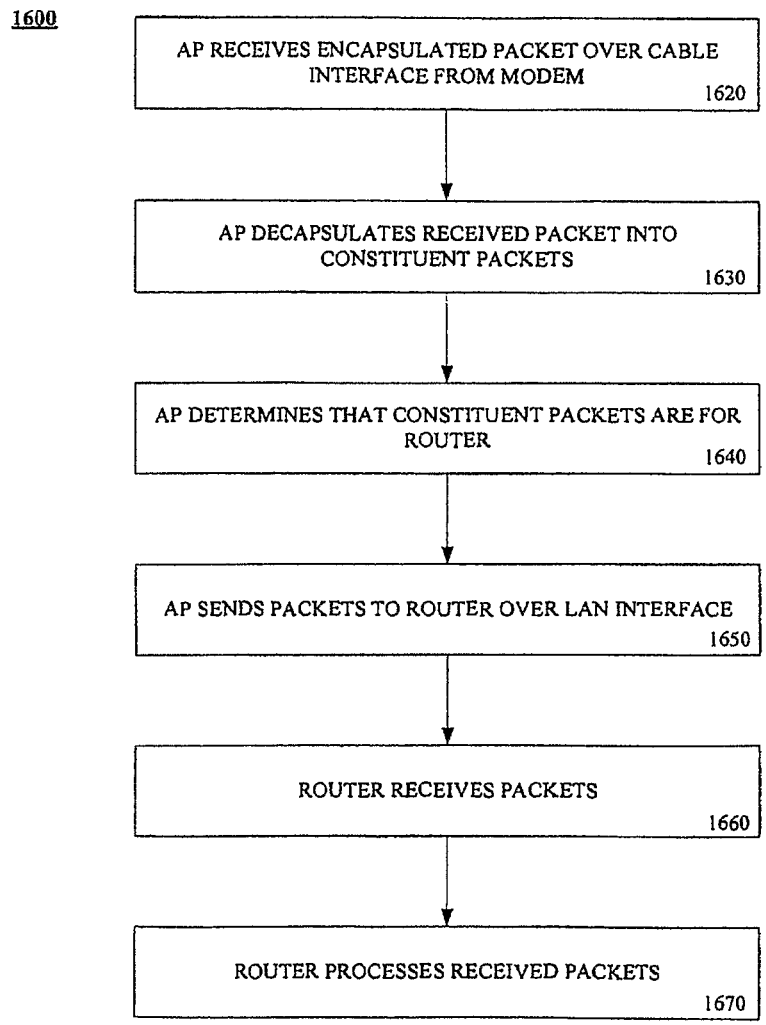
FIG. 16 includes a flow diagram of an implementation of an uplink reception process.

Referring to FIG. 16, a process 1600 depicts a process for receiving encapsulated frames/packets, decapsulating the packets, and delivering the constituent frames/packets. This process 1600 is also referred to as an AP to IP Core uplink process. The process 1600 includes an AP receiving an encapsulated packet from a modem over a cable interface (1620). In the implementation of FIG. 10, the AP 1030 receives the encapsulated frames/packet from the modem 1010. At the AP, the packet is received via the cable interface 1080 and is sent to the WLAN format interface 1075.

The AP decapsulates the received packet to extract the constituent packets that make up the encapsulated packet (1630). In the implementation of FIG. 10, the WLAN format interface 1075 sends the received (encapsulated) packet to the PADM 1076. The PADM 1076 performs decapsulation and provides the constituent frames/packets to the bridge 1074. Decapsulation is performed by examining, for example, the total packet number 1520, and the packet flag (for example, packet flag 1550) and packet length (for example, packet length 1560) of each packet descriptor (for example, packet descriptor 1530). By examining such data, the PADM 1076 is able to determine where each of the constituent packets starts and ends.

In particular, the PADM 1076 examines each constituent packet to ensure that the constituent packet is a complete LAN frame/packet. If the constituent LAN frame/ packet is not complete, then the PADM 1076 retains the incomplete frame/packet and waits until the rest of the LAN frame/packet is received (presumably in a subsequent encapsulated frame/packet) or until there is a timeout. When the rest of the LAN frame/packet is received, the PADM 1076 assembles the complete LAN frame/packet and forwards the complete LAN frame/packet to the bridge 1074.

Figure 17:
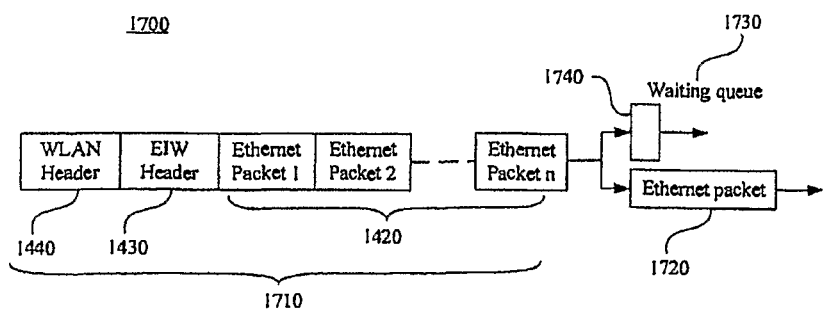
FIG. 17 includes a diagram depicting an implementation for decapsulating packets.

Referring to FIG. 17, the above implementation of the operation 1630 is depicted in a diagram 1700 for a received Ethernet-style encapsulated packet 1710. For simplicity, the received encapsulated packet 1710 is assumed to be the same as the transmitted packet described with reference to FIG. 14. However, it is understood that variations between a transmitted packet and a received packet might occur in some embodiments. The received packet 1710 includes the WLAN header 1440, the EIW header 1430, and the string of constituent Ethernet packets 1420.

As the PADM 1076 processes the received packet 1710, if a constituent Ethernet packet is complete, then the packet (for example, a packet 1720) is provided to the bridge 1074. If a constituent Ethernet packet is incomplete, then the incomplete packet is stored in a waiting queue 1730 (which need not be located in the PADM 1076) until the rest of the packet arrives or until a timeout occurs. The diagram 1700 shows an incomplete packet 1740 being stored in the waiting queue 1730. This may occur, for example, if an Ethernet packet spans two WLAN packets. When the packet is complete, the packet is sent to the bridge 1074. Note that a WLAN packet may include, for example, one complete Ethernet packet and one partial Ethernet packet.

Figure 18:
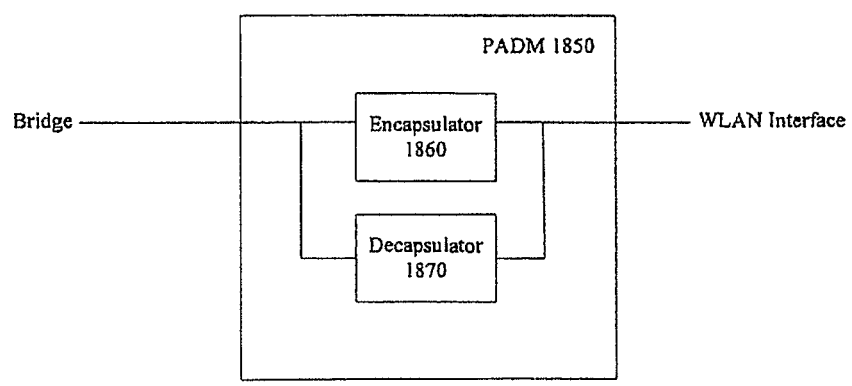
FIG. 18 includes a diagram depicting an implementation of a PADM from FIG. 10.

Referring to FIG. 18, to further describe the decapsulation process 1130 of FIG. 11, a PADM 1850 is depicted that provides an implementation of either of the PADMs 1016 or 1076. The PADM 1850 includes an encapsulator 1860 and a decapsulator 1870. The encapsulator 1860 and the decapsulator 1870 are communicatively coupled to a bridge and a WLAN format interface. Given the components of the PADM 1850, the PADM 1850 may, more specifically, be referred to as a packet encapsulation/decapsulation module. In operation, the encapsulator 1860 accepts Ethernet packets from the bridge and encapsulates the Ethernet packets, as described above. The encapsulated data is then provided to the WLAN format interface. In operation, the decapsulator 1870 receives encapsulated data from the WLAN format interface. The decapsulator 1870 decapsulates the received data as described above, and provides the decapsulated data to the bridge assuming there is no timeout.

As can be appreciated, other implementations are possible and envisioned. For example, another implementation combines an encapsulator and a decapsulator. Yet another implementation uses a virtual Ethernet interface feature of Linux. Note that other implementations of an AP or a modem (STA) may send an encapsulated packet from a WLAN format interface directly to a bridge. The bridge determines that the packet is encapsulated and sends the packet to a PADM.

Continuing with the process 1600 of FIG. 16, the AP determines that the constituent frames/packets are to be sent to a router (1640). This operation (1640) may be performed, as with many operations, at a different point in the process 1600. In the implementation of FIG. 10, the bridge 1074 determines that the frames/packets are to be sent to the router 1090. The AP then sends the constituent frames/packets to the router over a LAN interface (1650). In the implementation of FIG. 10, the bridge 1074 sends the constituent frames/packets to the LAN interface 1077, which sends the packets to the router 1090 over the LAN network 1082.

The router receives (1660) and processes (1670) the frames/packets. Processing may include, for example, sending the packets, or a portion thereof, to a further destination such as a web site with which a host is communicating or attempting to communicate. Further, in implementations in which an encapsulated packet includes LAN packets from multiple hosts, the router may send the underlying information to multiple web sites.

Figure 19:
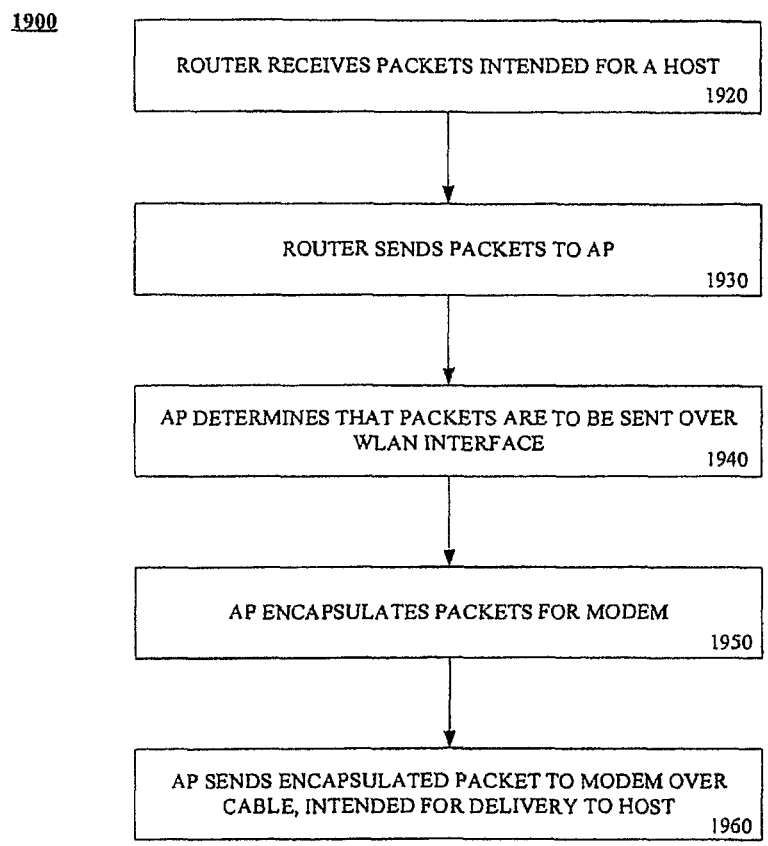
FIG. 19 includes a flow diagram of an implementation of a downlink transmission process.

Referring to FIG. 19, a process 1900 depicts a process for receiving frames/packets at an AP from a router. The frames/packets are encapsulated, and the encapsulated frames/packets are transmitted from the AP. The transmitted encapsulated frames/packets are intended for receipt by a modem, and the constituent frames/packets are intended for eventual delivery from the modem to one or more hosts. This process 1900 is also referred to as a downlink transmission process.

The process 1900 of FIG. 19 includes a router receiving one or more frames/packets intended for one or more hosts (1920), and the router sending the received frame(s)/packet(s) to an AP (1930). The router may receive frames/packets from, for example, one or more web sites that are attempting to communicate with one or more hosts. In the implementation of FIG. 10, the router 1090 receives frames/packets from the Internet 1095. The router 1090 then sends the received frames/packets over the LAN network 1082 to the LAN interface 1077 of the AP 1030.

The AP determines that at least one received frames/packet is to be sent through a WLAN format interface and cable interface to the modem (1940) via a cable network. In the implementation of FIG. 10, the LAN interface 1077 routes the received packets (which may be Ethernet or other LAN packets) to the bridge 1074. The bridge 1074 determines that a packet is to be sent through the WLAN format interface 1075 and the cable interface 1080 to, for example, the modem 1010 using the cable network 1040.

The AP encapsulates multiple packets for transmission to the modem, including the one or more received packets (1950). Note that the multiple packets are all received from the router, but may have been received at the router from one or more different sources (for example, different web sites). Further, the encapsulation may include the packet(s) received in operation 1920 and packets received earlier and stored in a queue.

Regarding the operation 1950, the bridge 1074 forwards the received packet(s) to the PADM 1076. The PADM 1076 queues the received packet(s), along with other packets intended for (for example) the modem 1010 and forms an encapsulated WLAN packet for the available downlink timeslot for the modem 1010. The PADM 1076 maintains a separate queue for each modem (also referred to as a station), including a first queue for the modem 1010 and a second queue for the modem 1020. The encapsulation is as described earlier in describing the PADM 1016 in conjunction with FIGS. 11-15.

The AP sends the encapsulated packet to the modem over a cable connection, intended for eventual delivery to one or more hosts (1960). In the implementation of FIG. 10, the PADM 1076 prepares a WLAN packet for each of the modems 1010 and 1020 in a round-robin manner. The PADM 1076 then supplies the prepared WLAN packets to the WLAN format interface 1075 for insertion into the corresponding downlink timeslots in the TDF superframe structure. The cable interface 1080 then transmits the WLAN encapsulated packets from the WLAN format interface to the modems 1010 and 1020, using the TDF superframe structure.

Figure 20:
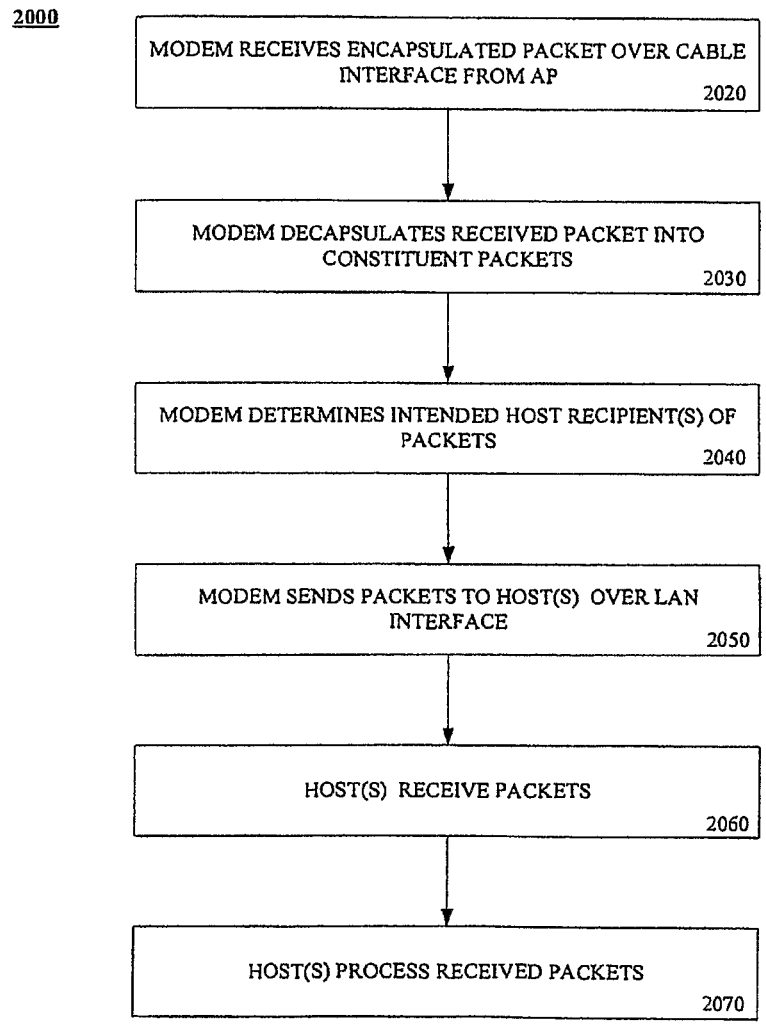
FIG. 20 includes a flow diagram of an implementation of a downlink reception process.

FIG. 20 depicts a process 2000 for receiving encapsulated packets, decapsulating the packets, and delivering the constituent packets. This process 2000 is also referred to as a downlink reception process. The process 2000 includes a modem receiving an encapsulated packet from an AP over a cable interface (2020). In the implementation of FIG. 10, the modem 1010 receives the encapsulated packet at the cable interface 1084 over a cable network 1040. The cable interface transfers the encapsulated packet to the WLAN format interface and the PADM 1016. The modem then decapsulates the received packet to extract the constituent packets that make up the encapsulated packet (2030). In the implementation of FIG. 10, the PADM 1016 performs decapsulation of the WLAN packet and provides the constituent LAN packets to the bridge 1014. The decapsulation may be performed, for example, as described earlier for the PADM 1076 in the discussion of FIGS. 16-18.

The modem determines that the constituent packets are to be sent to one or more intended host recipients (1940). This operation (2040) may be performed, as with many operations, at a different point in the process 2000. For example, the operation 2040 may be performed in conjunction with either of operations 2030 or 2050. In the implementation of FIG. 10, the bridge 1014 determines that the packets are to be sent to the host(s).

The modem then sends the constituent packets to the host(s) over an LAN interface (2050). In the implementation of FIG. 10, the bridge 1014 sends the constituent packets to the LAN interface 1015, which sends the packets to one or more of the host1 1054 and the host2 1056 over the LAN network 1052. The one or more hosts receive (2060) and process (2070) the packets. Processing may include, for example, a personal computer storing a multi-media file received over the Internet, or a personal digital assistant (PDA) displaying an electronic message (also received over the Internet) for viewing and interaction by a user. Many types of end-user devices that interface with a LAN network are possible recipients of the downloaded packets. Such devices may be end-user devices or lower-tier access points functioning via LAN 1052.

Wireless Dual Mode Device (WDMD) Modem

In the network architecture of FIG. 1, example modem stations (STA) 120 and 140 are depicted as having WLAN RF ports to support wireless devices 138 and 158. In one embodiment, the STAs contain the WLAN RF interface ports as an end user interface. As such, a STA may have both a cable interface supporting communications between an AP and the STA, and a WLAN RF external port to support wireless user devices. A STA having a cable interface and a WLAN external port may also be termed a wireless dual mode device (WDMD). In the embodiment of FIG. 1, such a WDMD can use mature WiFi chipsets to realize the WLAN format generation and RF generation functions of the STA. An example system, such as in FIG. 1, that includes one or more APs, a cable network, and one or more WDMDs performing the function of a STA may also be termed an asymmetric data over coaxial cable (ADoC) system. In comport with the above description of a TDF system, one or more protocol compliant ADoC access points (APs) and one or more stations (STAs) are deployed in the ADoCs cable access network. Thus, as used herein, the terms "ADoC system" and "TDF system" may be considered interchangeable because the ADoC system is a particular implementation of a TDF system. In the ADoC system, as in FIG. 1, the AP and STAs are connected via couplers in the hierarchy tree structure of a cable network that includes elements such as cable, splitters, amplifiers, relays, repeaters, switches, converters, and the like that are typical of cable network configurations.

Figure 21:
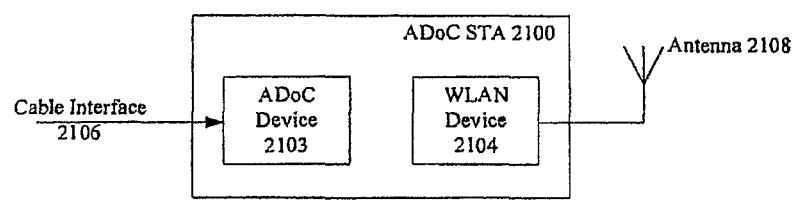
FIG. 21 is a block diagram of an ADoC STA.

Referring to FIG. 21, an inventive implementation for the hardware implementation of an ADoC STA 2100 is to integrate two devices, an ADoC device 2103 and a WLAN device 2104, into a single STA for the ADoC system. The ADoC device 2103 functions to connect with a coaxial cable interface 2106 to support bi-directional data communication in a cable network using TDF principles, while the WLAN device 2104 functions to connect with an antenna 2108 to support bi-directional data communication in a WLAN network. The STA 2100 swaps the data frames between ADoC device 2103 and WLAN device 2104, if needed, in order to enable wireless-enabled devices such as PCs, PDAs, routers, switches, printers, smart terminals, and the like in the WLAN network to access an IP network, such as the Internet or an Intranet, via the ADoC STA. The wireless devices may be located within wireless range of the STA, which may be located in a home or business setting.

In one embodiment, the STA architecture presented in FIG. 21 requires two standalone devices for channel encoder/decoder and data processing to provide Internet/Intranet access functionality for wirelessly connected device in the home or business WLAN. These two standalone devices may be combined, sharing some common subcomponents, to form a WDMD which is capable of switching between ADoC mode and WLAN mode. The single WDMD can provide the same access as the standalone devices for local networks.

Figure 22:
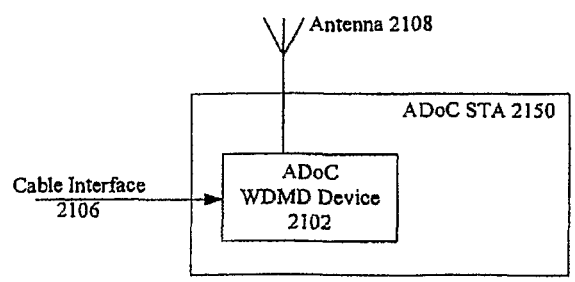
FIG. 22 is a block diagram of an ADoC STA having a dual mode device according to an implementation.

The dual mode ADoC device of FIG. 22 can support both ADoC mode and WLAN mode and switch between these two modes as needed. In ADoC mode, the dual mode device of FIG. 22 operates as an ADoC STA. While in WLAN mode, the dual mode device operates as a WLAN access point.

In order to realize the dual mode device 2102 of FIG. 22, the standard ADoC device 2103 is modified and evolved based on a mature WLAN device. The dual mode device 2102 is different from the WLAN device 2104 mainly in two aspects. First, the dual mode device 2102 transmits RF energy in an ADoC frequency band (about 1 GHz) while in ADoC mode instead of standard IEEE 802.11 frequency band (about 2.4 GHz). Second, in the media access control (MAC) layer, it does not utilize the conventional 802.11 DCF (Distributed Coordination Function) or PCF (Point Coordination Function) mechanism to exchange MAC frames in ADoC mode. Instead, dual mode device 2102 uses TDF protocol, which is based on a time division multiple access (TDMA) method, to transmit MAC frames in ADoC mode.

In one embodiment of a dual mode device, as shown in FIG. 22, the dual mode ADoC device 2102 is connected with a coaxial cable interface 2106 for the interconnection with a cable access network, and at the same time, it is connected with an antenna 2108 to support bi-directional data communication in a WLAN network. The ADoC STA 2150 housing the dual mode device swaps the data frames received during these two modes from this dual mode ADoC device 2102 if needed.

Hardware Architecture of the Dual Mode ADoC Device

Figure 23:
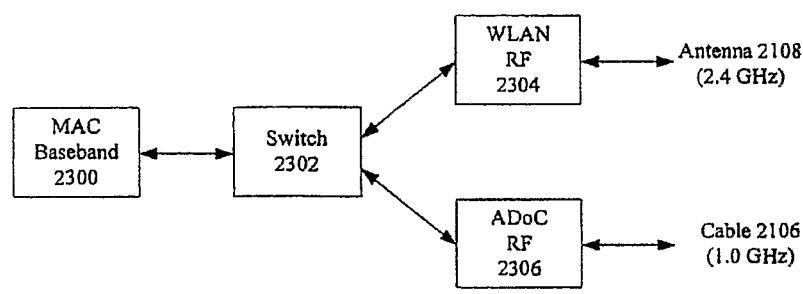
FIG. 23 is a block diagram of a hardware implementation of the ADoC STA dual mode device.

According to one hardware embodiment of the dual mode ADoC device 2102 shown in FIG. 23, a switch 2302 is provided which is a circuit configured to switch between the WLAN RF circuit 2304 and ADoC RF circuit 2306. The switch 2302 can be controlled by the MAC layer software. This implementation may require that some versions of a WLAN chipset be modified and the switch 2302 is added to the modified chipset. In some instances, this WLAN chipset modification is undesirable.

Figure 24:
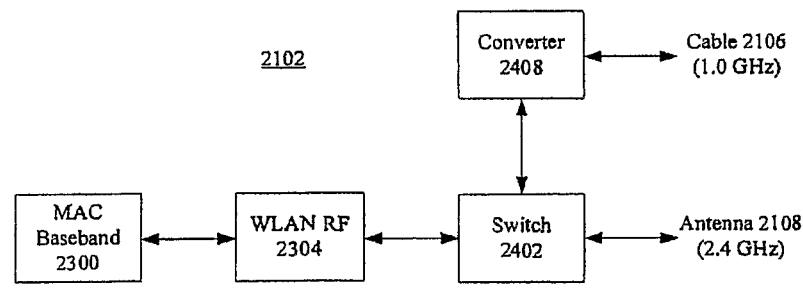
FIG. 24 is a block diagram of another hardware implementation of the ADoC STA dual mode device.

According to another hardware embodiment shown in FIG. 24, the location of a switch 2402 can be changed in terms of adjacency with the device's MAC baseband part 2300. In this embodiment, the converter 2408 translates the 2.4 GHz WLAN RF stage 2404 frequency to the 1 GHz ADoC spectrum. This lower frequency output is useful to propagate relatively long distances in a coaxial cable. Note that the MAC baseband part 2300 may be characterized as a communication device configured to enable a user device to communicate with the dual-mode ADoC device 2102. In contrast to the implementation of FIG. 23, the implementation of FIG. 24 is external to an existing WLAN chipset, and as such, does not require modifying a WLAN chipset. Thus, the configuration of FIG. 24 may, in some instances, be preferable to the FIG. 23 configuration.

In some networks, for example, LANs, physical layer carrier sensing is used to determine the current state of use of the underlying medium (wired or wireless). Only if the carrier sensing function indicates the medium is idle, can the station initiate the data transmission over the shared wireless or wired medium. The MAC (Medium Access Control) layer can access the result of physical layer carrier sensing and then reports it to higher layer.

Figure 25:
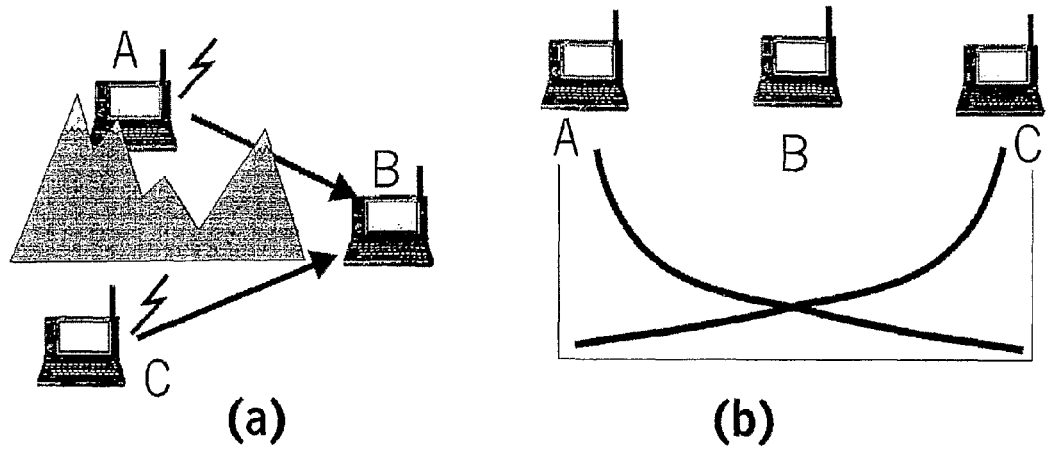
FIG. 25 depicts the "hidden station" problem.

However, there are some instances in which the physical layer carrier sensing cannot successfully detect other stations' transmission state and whether or not the channel is occupied. For example, as shown in FIG. 25, station A and C cannot hear each other because of obstacles or signal attenuation; so, when station A is transmitting frames, station C may also try to transmit frames at the same time because its underlying carrier sense mechanism can't successfully detect the transmission activity from station A, and as a result, their frames collide and corrupt. This is known as the "hidden station" problem.

Figure 26:
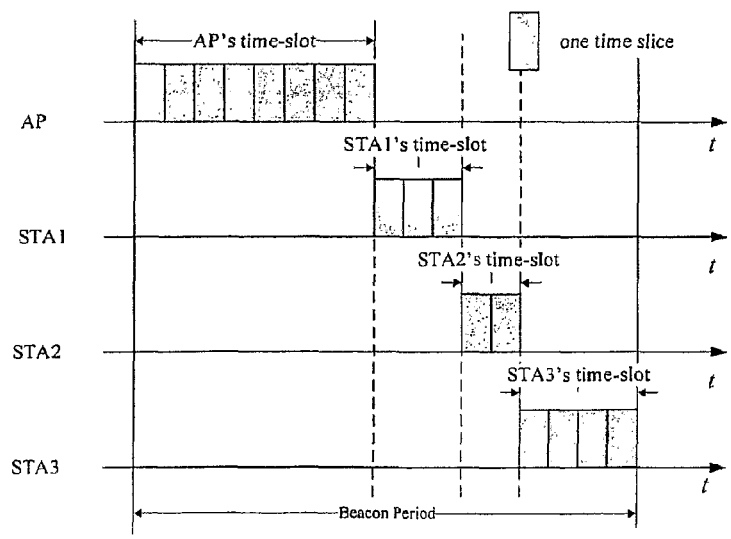
FIG. 26 illustrates the use of assigned timeslots by the AP and three stations.

In one embodiment of a TDMA based access control protocol in an infrastructure system, a superframe period is divided into a number of equal common timeslots, whose length is enough for a station to transmit at least one largest data frame plus a guard interval, and an integral number of continuous timeslots are allocated to the central access point or station and AP or assigned station is then allowed to access the medium during the allocated timeslot, as shown in FIG. 26.

The access point of the present invention is responsible for allocating and adjusting timeslots to itself or stations to ensure that they gain access to the medium in non-overlapping timeslots. The access point assigns a unique Association ID (AID) to every associated station in ascending order starting at 0 and delivers the assigned AID to the station in an association response management frame. When a station disassociates from AP, AP reuses the AID for the next station which requests association with the AP.

In the present invention, every allocated timeslot is authorized to be accessed by two owners: one main owner and one backup owner. How to determine the main owner and backup owner for the timeslot is defined as follows.

Figure 27:
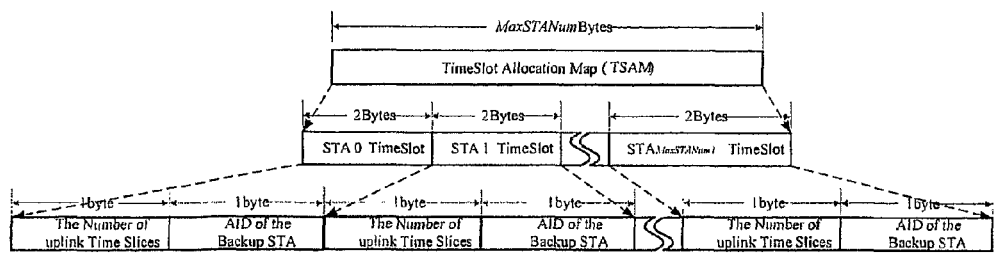
FIG. 27 is an exemplary timeslot allocation map (TSAM).

A time-slot allocation map (TSAM) information element carried by a special synchronization frame, which is transmitted at the beginning of every superframe by the access point, is used to indicate the AP and STAs timeslot allocation scheme. This timeslot allocation map is shown in FIG. 27.

The Time-Slot Allocation Map contains MaxSTANum fields and every field contains two subfields. The first subfield contains the number of corresponding STA's uplink timeslots that the AP allocates to the STA and the second subfield contains the AID of the backup station for these time slices.

After the station receives the synchronization frame, it extracts the timeslot allocation map and uses its own AID as an index into the map to calculate its starting time and stopping time in the whole timeslot space of the superframe. In this way, the station can determine for which timeslot it is the main owner. Meanwhile, the station also compares its AID with the "AID of the backup STA" subfield in the TASM, and if they are equal, the STA knows that it is the backup owner for the corresponding timeslot and so the backup owner can use the corresponding time slot if it has not been used by the main owner for the slot.

Furthermore, the mapping between the main owner and the backup owner can be dynamically adjusted among different superframes based on the access point's observation and intelligence. For instance, if the AP observes that there is never any uplink traffic transmitted in some allocated timeslots for a period of time, then the access point may try to adjust the corresponding mapping so as to improve the channel utilization, e.g., choose another station as the backup owner based on the predefined criteria or past observation.

Besides the method described above, there are other methods for passing such main owner/backup owner mapping information. For example, the main owner/backup owner mapping table can be concatenated to a kind of timeslot allocation map, which only shows the relationship between one timeslot and its corresponding main owner, and then transmitted to all stations in each or some special synchronization frames.

When the timeslot for which the station is the main owner starts, if the station has frames to transmit, it will send them during the allocated timeslot immediately. If there is no data to send, the station remains silent.

When the timeslot for which the station is the backup owner starts, the backup owner senses the shared physical media immediately. If the channel sensing result shows there is data transmission in the media during a predefined SensingInterval period, the station knows that the main owner is using the media and refrains from using the timeslot. If the channel sensing results shows there is no data transmission over the media for the period of SensingInterval, the backup owner knows that the main owner of the timeslot has no data to transmit, and will use the timeslot for uplink data transmission if there are frames in this backup owner's output queue. In this way, the channel utilization rate for TDMA based access control protocol will be greatly improved.

It is possible for a station to be both the main owner of one timeslot and the backup owner of another timeslot. Meanwhile, it is also possible for a station to not be the backup owner of any timeslot. It is also possible for a station to be the owner of multiple time slots. However, to ensure that an associated station has a guaranteed transmission opportunity during a superframe, a station must be a main owner for at least one time slot.

As a main owner for one timeslot, the station is authorized to transmit its traffic during the assigned timeslot. As a backup owner for one timeslot, the station will be able to transmit its traffic only when the main owner of the assigned timeslot has no traffic to transmit during the assigned timeslot. If a station is assigned as the main owner of multiple timeslots, the station is given more transmission opportunities. Thus, there is a rudimentary form of prioritization. In contrast, when a station is assigned as backup owner of multiple timeslots, the STA may have more opportunities to transmit its traffic during these timeslots and the opportunities depend upon whether or not the main owner of the timeslots has traffic to transmit.

Referring again to FIG. 25, which depicts the "hidden station" or "hidden terminal" problem, it is clear that if two stations are hidden from each other, they cannot be assigned as the main owner and backup owner for a same timeslot. Otherwise, when the main owner of the timeslot is sending traffic during the assigned timeslot, the backup owner of the timeslot will fail to detect the transmission activity and believe that the media is idle and send its own traffic during the assigned timeslot. In order to avoid this situation and improve performance under the "hidden station" situation, two alternative methods can be employed. The first method is that every station monitors the channel all the time and reports to the access point which stations can be heard by it. The stations that can be heard by a station are denoted as "visible stations" herein. This kind of report may be periodically transmitted or only triggered when changes have occurred in the visible station lists. Changes in the "visible stations" list would be known by the AP and the AP would request a report from all of its associated stations when such a change occurred. Based on these reports from the associated stations, the access point maintains a "visible station" list for every station, in which every station's corresponding visible stations are listed. The AP then selects a backup owner from the visible station list for the main owner of the timeslot. The second method occurs when the AP determines that there has been a relatively high frame/packet loss rate during a particular timeslot for a predetermined number of superframes. This situation may occur because the main owner and the backup owner are hidden from each other. The AP can then replace the backup owner with another station in the main station's visible station list.

Figure 28:
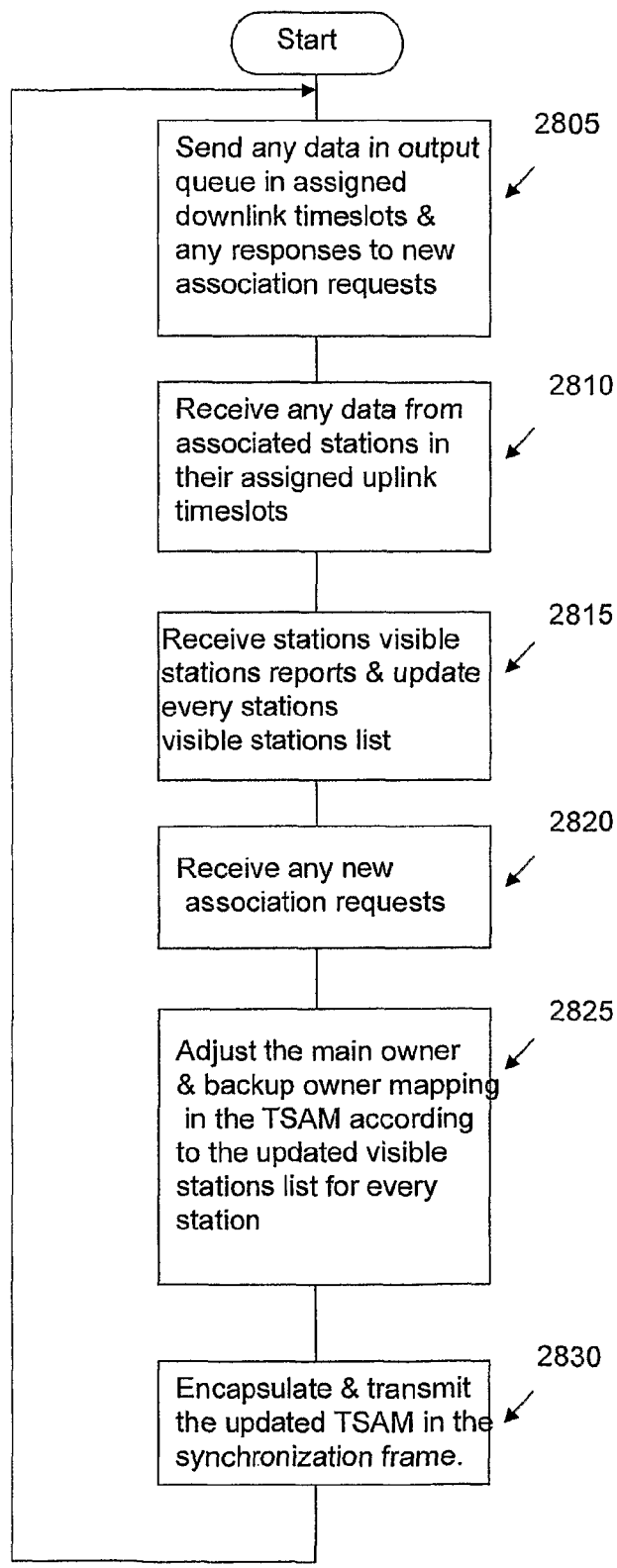
FIG. 28 is a flowchart of exemplary operation of an access point (AP).

FIG. 28 is a flowchart of exemplary operation of an access point (AP). FIG. 28 assumes that the AP and its associated stations have been powered on and have been initialized. That is, it is assumed that the initial main and backup timeslot owner assignments have been made and the TSAM has been created, encapsulated and transmitted to the initial associated stations. At 2805 the AP sends/transmits any data in its output queues for its associated stations in its assigned downlink timeslots. The AP also transmits any responses to any new station association requests in its assigned downlink timeslots. The AP then is open to receive any data from its associated stations that the stations send in their assigned uplink timeslots at 2810. At 2815 the AP also receives visible station reports from its associated stations and updates every stations visible station list. It should be noted that the AP and its associated stations may be configured to request the list rather than receive it automatically periodically. The request may be based on, for example, frame/packet loss rate or other event. The AP may then receive new requests for association from stations in the subslots of the contention timeslot at 2820. The AP then adjusts the main owner and backup owner mapping in the TSAM according to the updated visible station list for every stations at 2825. At 2830 the AP encapsulates and transmits the updated TSAM in the synchronization timeslot. The TSAM is encapsulated (put into) a MAC frame. The MAC header includes a source address field and a destination address. The source address field identifies the sender of the MAC frame and the destination address field identifies the receiver of the MAC frame. Without this information the network will not know where to deliver the TSAM.

Figure 29:
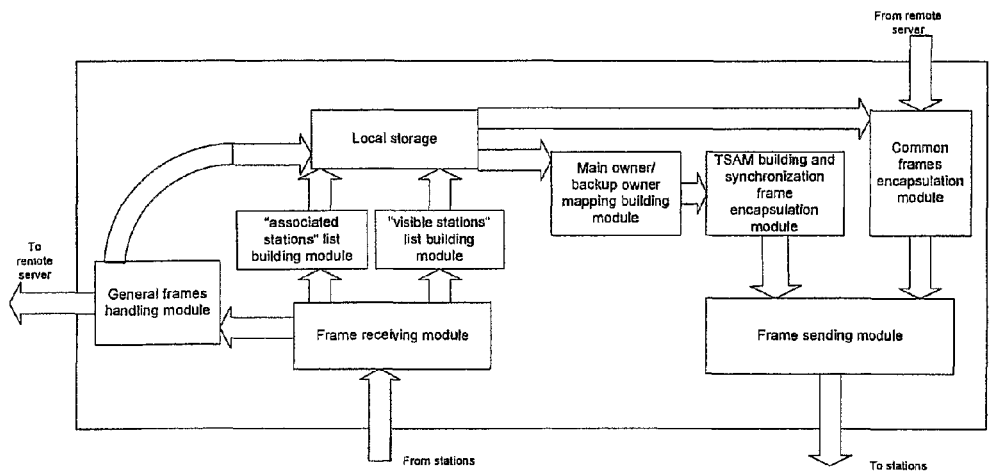
FIG. 29 is a block diagram of an exemplary embodiment of an access point.

FIG. 29 is a block diagram of an exemplary embodiment of an access point. It should be understood that the access point may have more or fewer than the described modules as alternative embodiments may combine modules and their functionality or may split modules and their functionality. The frame receiving module receives all frames, including visible station report frames from all associated stations and other frames (called as "general frames"), destined for it. It should be noted that data/content can be formatted/packaged as frames or packets. Such notation merely indicates that data are packaged or grouped together according to a format for transmission over a communications medium. Accordingly, the frame receiving module provides input to the "visible stations" list building module, the "associated stations" list building module and the general frames handling module. The general frames handling module handles all frames, except visible station report frames from all associated stations. The general frames handling module sends data/content frames into local storage or remote servers for different frames received. The "associated stations" list building module receives input from the frame receiving module. The "associated stations" list building module builds a station list for all stations associated with this AP and then stores the list into local storage. The "visible stations" list building module receives input from the frame receiving module. The "visible stations" list building module builds a vision stations list for every station associated with the AP based on the received visible stations report frames. The "visible stations" list building module then stores the visible station list into local storage.

Local storage is self explanatory and may be any form of storage including memory, discs, optical discs, etc. Local storage as indicated above receives and stores data received from the general frames handling module, the "visible stations" list building module and the "associated stations" list building module. Local storage provides data to the main owner/backup owner map building module and the common frames encapsulation module. The main owner/backup owner map building module builds a main owner/backup owner mapping based on the visible stations list for every station. The mapping may also be built on the access point's observation of the previous main owner's/station's and backup owner's/station's traffic, for example packet/frame loss rate. The main owner/backup owner map building module provides input to the TSAM building and synchronization frame encapsulation module. The TSAM building and synchronization frame encapsulation module creates/populates the TSAM and then encapsulates the TSAM into a synchronization frame for insertion into the synchronization timeslot. The TSAM building and synchronization frame encapsulation module provides input to the frame sending module which sends/transmits frames in the AP's downlink timeslots as well as the synchronization timeslot. The common frames encapsulation module receives input from local storage. The common frames encapsulation module encapsulates all frames, except the synchronization frames, received either from the local storage or an external remote server (such as content server). The frame sending module receives input from the common frames encapsulation module and the TSAM building and synchronization frame encapsulation module. The frame sending module sends/transmits all frames in the buffer/output queue within the downlink timeslots assigned in the TSAM as well as sending/transmitting the TSAM in the synchronization timeslot.

Figure 30:
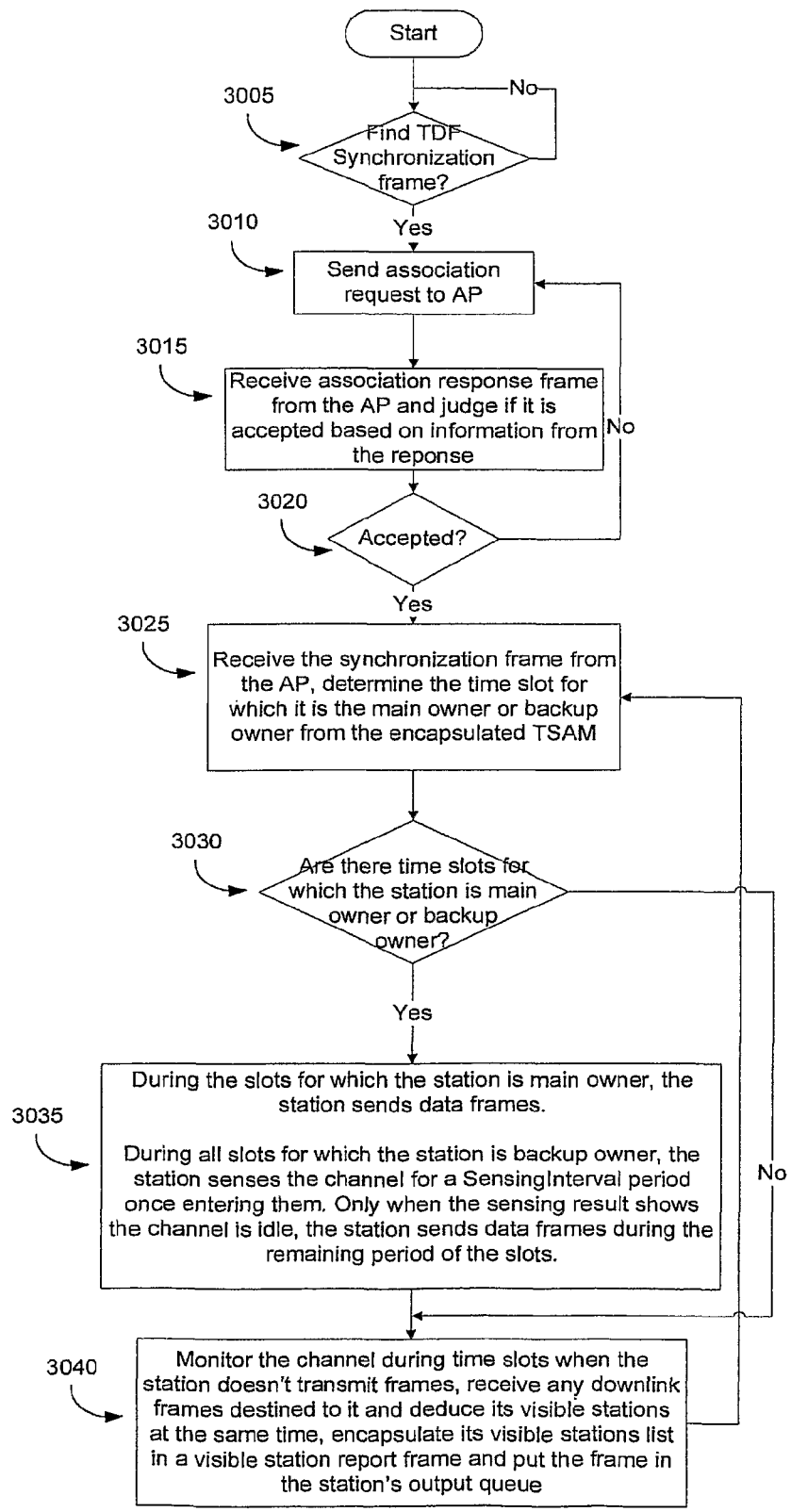
FIG. 30 is a flowchart of exemplary operation of a station associated with an access point.

FIG. 30 is a flowchart of exemplary operation of a station associated with an access point. At 3005 the station hears/finds a TDF synchronization frame in an AP's synchronization timeslot. If the station does not hear/find a TDF synchronization frame, it keeps listening until it finds one or until it determines it should be in wireless mode if it is a dual mode station/modem. If the station hears/finds a TDF synchronization frame then the station sends an association request to the AP in the contention timeslot (in one of the contention time-subslots) at 3010. At 3015 the station receives the association response frame from the AP and decodes it. A test is performed at 3020 to determine if the station's association request has been accepted. If the station's association request has not been accepted the station waits for the next contention timeslot and sends/transmits another association request to the AP in the contention timeslot (in one of the contention time-subslots). If the station's association request was accepted then at 3025 the station receives the synchronization frame from the AP and determines the timeslot for which the station is the main owner or backup owner from the encapsulated TSAM. A test is performed at 3030 to determine if there are timeslots for which the station is the main owner or backup owner. If there are timeslots for which the station is the main owner, then at 3035 the station sends/transmits data frames during all of the timeslots for which the station is the assigned main owner. If there are any timeslots for which the station is the backup owner, then at 3035 for all timeslots for which the station is the backup owner, the station senses the channel/medium for a SensingInterval when the particular backup timeslot starts. Only when the results of the SensingInterval indicate that the channel/medium is idle, does the station send/transmit data frames during the remaining assigned timeslot(s). During the time slots when the station doesn't send traffic out, at 3040 the station monitors the channel/medium in order to capture information regarding visible stations and receives any frames sent to it by the AP. The visible stations information/list is encapsulated into a visible station report frame and put into the station's output queue for transmission at a next transmission opportunity.

Figure 31:
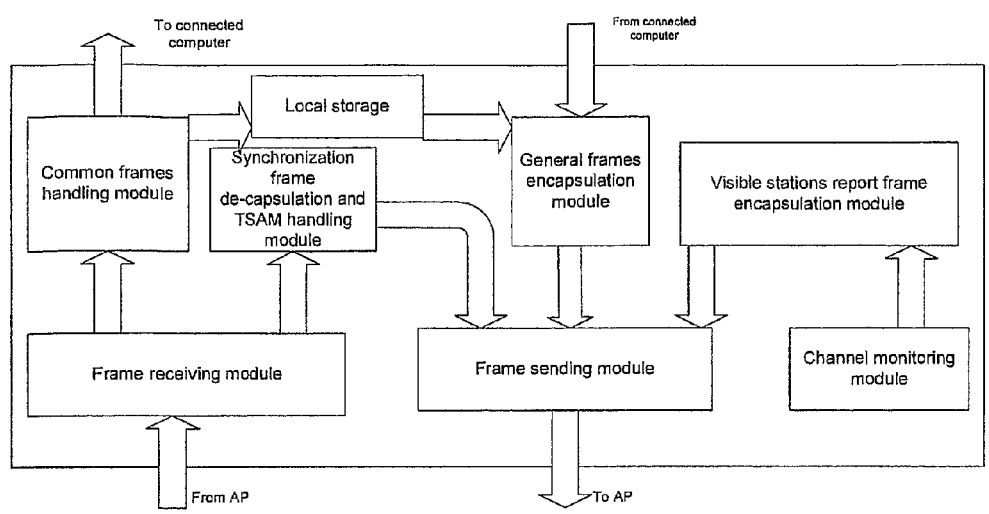
FIG. 31 is a block diagram of an exemplary embodiment of a station associated with an access point.

FIG. 31 is a block diagram of an exemplary embodiment of a station associated with an access point. It should be understood that the station may have more or fewer than the described modules as alternative embodiments may combine modules and their functionality or may split modules and their functionality. The frame receiving module receives all frames, including a synchronization frame and other frames ("common frames"), destined for it sent/transmitted by the AP with which the station is associated or wants to be associated. The frame receiving module provides input to the common frames handling module and the synchronization frame decapsulation and TSAM handling module. The common frame handling module handles all frames from the AP, except the synchronization frame. The common frame handling module sends data/contents into local storage or computers which are connected with this station. The synchronization frame decapsulation and TSAM handling module receives input from the frame receiving module. The synchronization frame decapsulation and TSAM handling module decapsulates the synchronization frame, extracts the TSAM from the decapsulated TSAM and retrieves the timeslot information for which the station is the main owner or backup owner and provides this information to the frame sending module for future reference and use.

The channel monitoring module monitor the channel/medium to determine and record which stations' traffic the station can hear and provides input to the visible station report frame encapsulation module. The visible station report frame encapsulation module receives input from the channel monitoring module. The visible station report frame encapsulation module compiles the visible stations list, according to information received from the channel monitoring module and then encapsulates the visible stations list/information into the visible station report frame. The visible station report frame encapsulation module provides input to the frame sending module. The general frames encapsulation module encapsulates the station's frames, except station report frames, either from the local storage or computers which are connected to this station. The general frames encapsulation module provides input to the frame sending module. The frame sending module receives input from the general frames encapsulation module, the visible station report frame encapsulation module and the synchronization frame decapsulation and TSAM handling module. The frame sending module transmits the frames buffered in the station's output queue to the associated AP, during the timeslot for which the station is the main owner and the timeslots for which the station is the backup owner after it detects the channel is idle after sensing the media for a SensingInterval after the start of the timeslot. The sensing is performed via a physical layer channel sensing mechanism.

The present invention may be applicable to any TDMA based system in which physical layer channel sensing is employed. Other methods to increase channel/medium utilization operate with significantly more overhead.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for operating a time division function protocol compliant access point, said method comprising:
  receiving a report from an associated station, the report comprising stations visible to the associated station;
  updating a list responsive to said report, the list comprising said visible stations of the associated station;
  adjusting a timeslot allocation map responsive to said updated list;
  encapsulating said adjusted map;
  transmitting said encapsulated adjusted map; and
  assigning a timeslot specified in said timeslot allocation map to said associated station, wherein said associated station is one of a main owner and a backup owner of said assigned timeslot, wherein said main owner of said assigned timeslot has full transmission rights and wherein said backup owner of said assigned timeslot has conditional transmission rights to transmit data over a communications channel that is idle for a time interval during said timeslot.

2. The method according to claim 1, further comprising:
  transmitting downlink data in said assigned timeslot; and
  receiving uplink data from said associated station.

3. The method according to claim 1, further comprising:
  receiving a request from a station to associate; and
  transmitting a response responsive to said request.

4. A method for operating a time division function protocol compliant station associated with an access point, said method comprising:
  receiving a synchronization frame over a communications channel;
  decapsulating a map located in said synchronization frame;
  determining if there is a timeslot specified in said map for which said associated station is one of an assigned main owner and an assigned backup owner;
  if the associated station is said assigned main owner of said timeslot, transmitting data over said communications channel during said timeslot;
  if the associated station is said assigned backup owner of said timeslot, sensing said communications channel for a time interval during said timeslot and transmitting data over said communications channel that is idle for said time interval during said timeslot.

5. The method according to claim 4, further comprising:
  monitoring said communications channel;
  determining which stations are heard transmitting over said communications channel;
  preparing a list responsive to said determination;
  preparing a report responsive to said list; and
  storing said report as data in an output queue.

6. The method according to claim 4, further comprising:
  transmitting a request to associate with an access point;
  receiving a response responsive to said association request; and
  determining if said request has been accepted based on information in said response.

* * * * *